(12) United States Patent
Koshio et al.

(10) Patent No.: US 9,304,339 B2
(45) Date of Patent: Apr. 5, 2016

(54) METHOD FOR MANUFACTURING LIQUID CRYSTAL DISPLAY PANELS

(75) Inventors: Satoru Koshio, Ibaraki (JP); Kazuo Kitada, Ibaraki (JP); Tomokazu Yura, Ibaraki (JP); Takuya Nakazono, Ibaraki (JP); Masahiro Takigawa, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 13/154,023

(22) Filed: Jun. 6, 2011

(65) Prior Publication Data

US 2011/0315297 A1    Dec. 29, 2011

(30) Foreign Application Priority Data

Jun. 24, 2010  (JP) .................................. 2010-143718
Nov. 18, 2010  (JP) .................................. 2010-257424

(51) Int. Cl.
*G02F 1/00* (2006.01)
*G02F 1/13* (2006.01)
(Continued)

(52) U.S. Cl.
CPC ............ *G02F 1/1309* (2013.01); *G02F 1/1333* (2013.01); *G02F 1/133528* (2013.01); *G02F 2202/22* (2013.01); *G02F 2202/28* (2013.01)

(58) Field of Classification Search
CPC ................ G02F 1/1309; G02F 1/1333; G02F 1/133528; G02F 2202/22; G02F 2202/28
USPC .................... 156/64, 247, 248, 297
See application file for complete search history.

(56) References Cited

U.S. PATENT DOCUMENTS

2005/0016670 A1    1/2005  Kanbara et al.
2006/0124248 A1    6/2006  Kanbara et al.
(Continued)

FOREIGN PATENT DOCUMENTS

DE    102009004181 A1    10/2009
JP    58-181026 A    10/1983
(Continued)

OTHER PUBLICATIONS

Japanese Office Action dated Jan. 6, 2011, issued in corresponding Japanese Patent Application No. 2010-257424.
(Continued)

*Primary Examiner* — George Koch
(74) *Attorney, Agent, or Firm* — Westerman, Hattori, Daniels & Adrian, LLP

(57) ABSTRACT

The invention is a method for continuously manufacturing an inspected liquid crystal display panel, includes: a liquid crystal cell feeding step including feeding a liquid crystal cell having a first substrate and a second substrate; a first polarizing plate providing step including providing a first polarizing plate from a first polarizing plate roll; a first polarizing plate laminating step including laminating the first polarizing plate to the first substrate; a second polarizing plate providing step including providing a second polarizing plate from a second polarizing plate roll; a second polarizing plate laminating step including laminating the second polarizing plate to the second substrate to obtain a liquid crystal display panel after laminating the first polarizing plate to the first substrate; and an inspecting step including optically inspecting the liquid crystal display panel without applying voltage to the liquid crystal panel, wherein the first substrate is less susceptible to electrostatic decay in the liquid crystal cell than the second substrate.

9 Claims, 7 Drawing Sheets

(51) Int. Cl.
*G02F 1/1333* (2006.01)
*G02F 1/1335* (2006.01)

(56) References Cited

U.S. PATENT DOCUMENTS

| | | |
|---|---|---|
| 2009/0218049 A1 | 9/2009 | Kanbara et al. |
| 2009/0263608 A1* | 10/2009 | Kitada et al. ............ 428/41.8 |
| 2010/0186890 A1 | 7/2010 | Kitada et al. |
| 2010/0282406 A1 | 11/2010 | Kitada et al. |
| 2010/0283943 A1 | 11/2010 | Kimura et al. |
| 2010/0288420 A1 | 11/2010 | Kimura et al. |
| 2010/0316817 A1 | 12/2010 | Kimura et al. |

FOREIGN PATENT DOCUMENTS

| | | |
|---|---|---|
| JP | 2-66518 A | 3/1990 |
| JP | 11-249124 A | 9/1999 |
| JP | 2000-047242 A | 2/2000 |
| JP | 2001-117065 A | 4/2001 |
| JP | 2002-250698 A | 9/2002 |
| JP | 2004-133355 A | 4/2004 |
| JP | 2005-37417 A | 2/2005 |
| JP | 2005-043384 A | 2/2005 |
| JP | 2006-078317 A | 3/2006 |
| JP | 2006-243275 A | 9/2006 |
| JP | 2007-187960 A | 7/2007 |
| JP | 2007-233313 A | 9/2007 |
| JP | 2007-256106 A | 10/2007 |
| JP | 2008-083492 A | 4/2008 |
| JP | 2008-197218 A | 8/2008 |
| JP | 2008-203861 A | 9/2008 |
| JP | 2009-229956 A | 10/2009 |
| JP | 2009-250893 A | 10/2009 |
| JP | 2010-117458 A | 5/2010 |
| JP | 2010-170126 A | 8/2010 |
| TW | 200949321 A1 | 12/2009 |
| WO | 2009/084370 A1 | 7/2009 |
| WO | 2010/074194 A1 | 7/2010 |

OTHER PUBLICATIONS

European Search Report dated Sep. 16, 2011, issued in corresponding European Patent Application No. 11168932.9.
Taiwanese Office Action dated Dec. 13, 2011, issued in corresponding Taiwanese Patent Application No. 099140057.
Office Action dated Dec. 1, 2014, issued in corresponding Chinese Patent Application No. 201210234282.2, with English translation (15 pages).
Non-Final Office Action dated Oct. 23, 2015, issued in U.S. Appl. No. 14/307,630 (20 pages).
Office Action dated Apr. 9, 2015, issued in U.S. Appl. No. 14/307,630 (24 pages).

* cited by examiner

Comparison of amounts of electrostatic charge on substrates

Comparison of amounts of electrostatic charge on substrates

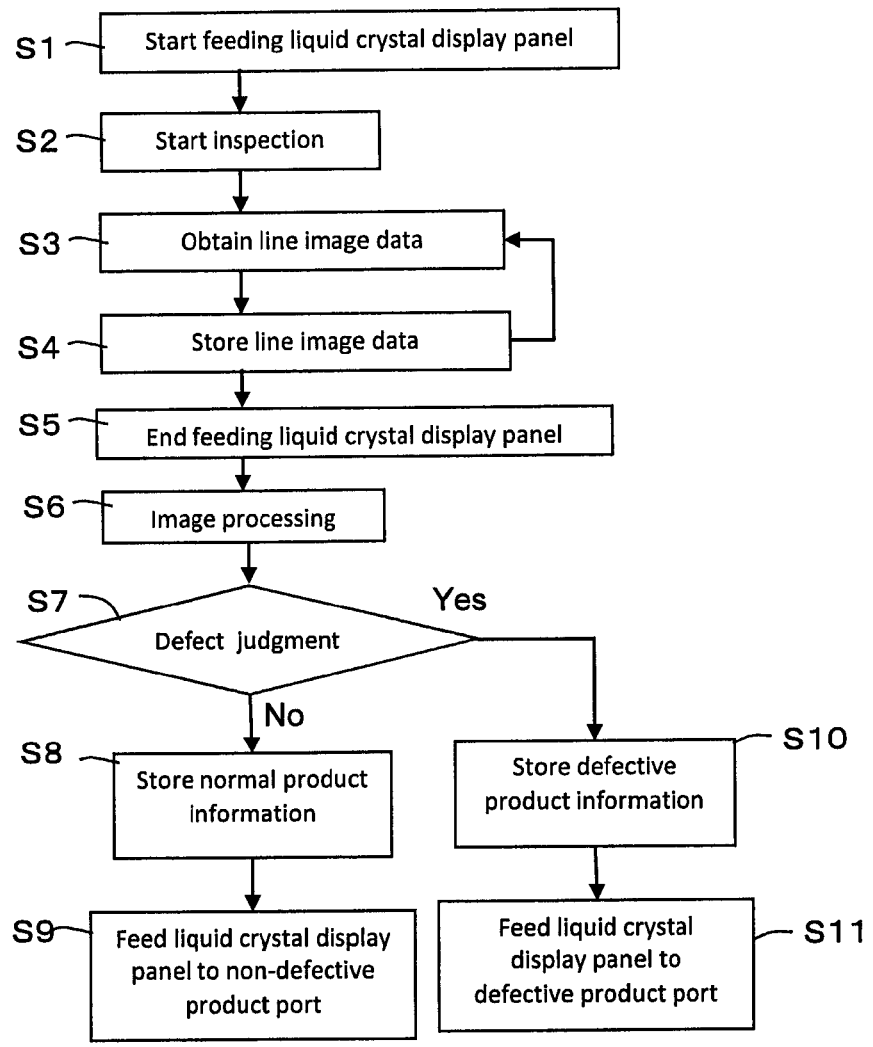

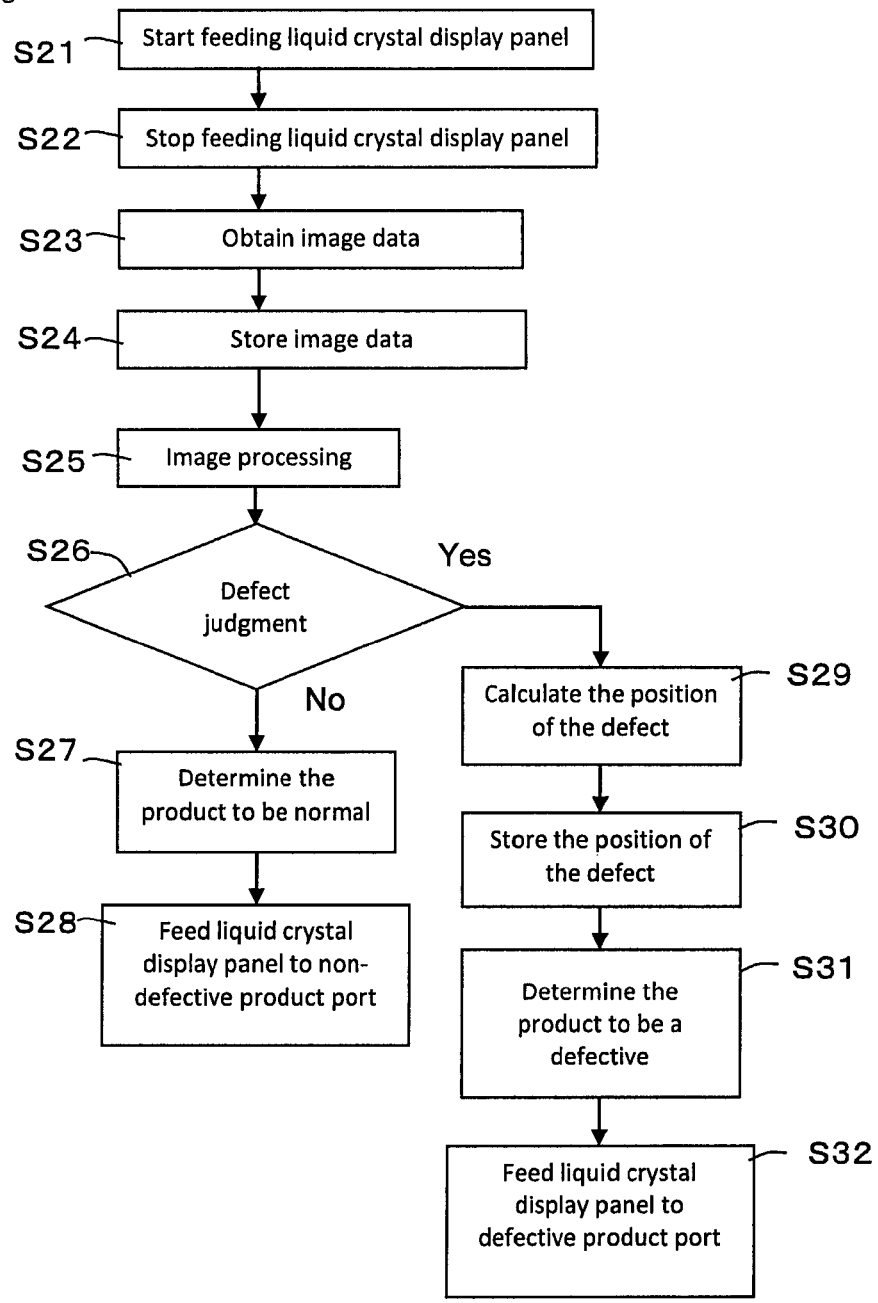

METHOD FOR MANUFACTURING LIQUID CRYSTAL DISPLAY PANELS

BACKGROUND OF THE INVENTION

1. Field of the Invention

The invention relates a system and a method for continuously manufacturing liquid crystal display panels. More specifically, the invention relates to a system and a method for manufacturing liquid crystal display panels by a process that includes sequentially bonding first and second polarizing plates, which are drawn and supplied from first and second polarizing plate rolls, respectively, to both surfaces of a liquid crystal cell to form a liquid crystal display panel; and optically inspecting the liquid crystal display panel.

2. Background Art

A system for continuously manufacturing liquid crystal display panels is disclosed, in which first and second polarizing plates, which are drawn and supplied from first and second polarizing plate rolls, respectively, are sequentially bonded to both surfaces of a liquid crystal cell to form a liquid crystal display panel (Japanese Patent Application Laid-Open (JP-A) No. 2005-37417). An apparatus for inspecting liquid crystal display panels is also disclosed, in which light is irradiated to one side of a liquid crystal display panel, and light transmitted through the liquid crystal display panel is imaged at the other side of the liquid crystal display panel (JP-A No. 2007-256106).

Prior art document: Japanese Patent Application Laid-Open (JP-A) No. 2005-37417 and Japanese Patent Application Laid-Open (JP-A) No. 2007-256106.

In view of continuous production of high-quality liquid crystal display panels, it is advantageous that bonding means and inspection means placed in a series of feed lines (in a continuously line) for feeding a liquid crystal cell and a liquid crystal display panel are used in a process including bonding polarizing plates to both surfaces of a liquid crystal cell and then quickly performing optical inspection of the liquid crystal display panel. This is because when the process is performed in the continuous line with the bonding speed and the inspection speed set equal to each other (or with the inspection speed set higher than the bonding speed), the liquid crystal display panel is prevented from waiting for a long time for the inspection after the bonding process, so that high-quality liquid crystal display panels can be continuously produced at high speed.

According to findings by the inventors, when a bonding process and an inspection process are performed at high speed in a series of feed lines (in a continuous line) for feeding a liquid crystal cell and a liquid crystal display panel, non-defective products with no quality problem are sometimes misjudged to be defective in the inspection process. It has been found that as a result of re-inspection of such liquid crystal display panels determined to be defective, they are determined to be non-defective. This is considered to be because during the bonding of the polarizing plate, the liquid crystal cell is electrostatically charged so that the alignment of the liquid crystal molecules are changed, and due to such an effect, the product, which has been once determined to be defective in the inspection process performed in the continuous line, regains the aligned state of the liquid crystal molecules after a lapse of time, and is determined to be non-defective when re-inspected in such a state.

This problem is a new problem with high-speed continuous production of liquid crystal display panels, which is caused by a process in which a bonding process with bonding means and an inspection process with inspection means are performed at high speed in a series of feed lines (in a continuous line) for feeding a liquid crystal cell and a liquid crystal display panel.

SUMMARY OF THE INVENTION

The invention has been made under the circumstances described above, and an object of the invention is to provide a system and a method for continuously manufacturing a liquid crystal display panel, which have high productivity and can inspect products for proper quality even when a bonding step and an optical inspection step are performed at high speed in a serried of feed lines (in a continuous line) for feeding a liquid crystal cell and a liquid crystal display panel.

As a result of investigations to solve the problems, the invention described below has been accomplished.

The invention is directed to a system for continuously manufacturing an inspected liquid crystal display panel, includes:

a liquid crystal cell supply means that supplies a liquid crystal cell having a first substrate and a second substrate;

a first polarizing plate supply means that supplies a first polarizing plate from a first polarizing plate roll;

a first polarizing plate bonding means that bonds the first polarizing plate to the first substrate;

a second polarizing plate supply means that supplies a second polarizing plate from a second polarizing plate roll;

a second polarizing plate bonding means that bonds the second polarizing plate to the second substrate to form a liquid crystal display panel after laminating the first polarizing plate to the first substrate; and an inspection means that optically inspects the liquid crystal display panel without applying voltage to the liquid crystal panel, wherein the first substrate is less susceptible to electrostatic decay in the liquid crystal cell than the second substrate.

In the invention, the first polarizing plate bonding means, the second polarizing plate bonding means and the inspection means are placed in a continuous feed line for feeding the liquid crystal cell and the liquid crystal display panel.

Therefore, the order of bonding the polarizing plates is such that the polarizing plate is first bonded to the first substrate of the liquid crystal cell, "which is relatively less susceptible to electrostatic decay," and then the polarizing plate is bonded to the second substrate of the liquid crystal cell, "which is relatively more susceptible to electrostatic decay". In this case, even when the liquid crystal cell is electrostatically charged during the bonding of the polarizing plate, the electrostatic charge on the liquid crystal cell can be quickly attenuated, so that the resulting liquid crystal display panel can be quickly and optically inspected for proper quality (by non-lighting inspection). After the bonding of the polarizing plates, therefore, the liquid crystal display panel can be prevented for waiting for a long time until the electrostatic charge on the liquid crystal cell is attenuated, or there is no need to apply a voltage to the liquid crystal cell (more specifically, the liquid crystal layer) for removal of the electrostatic charge on the liquid crystal cell, so that non-lighting inspection of the liquid crystal display panel can be quickly performed for proper quality. In addition, non-lighting inspection of the liquid crystal display panel does not need to apply a voltage to the liquid crystal cell during the inspection, in contrast to a lighting inspection in which a voltage is applied to the liquid crystal cell, and therefore allows high-speed inspection. Therefore, the inspection of the liquid crystal display panel can be performed at a speed equal to or higher than the polarizing plate-bonding speed, in a series of feed lines (in a continuous line) for feeding the liquid crystal cell and the liquid crystal display panel. As a result, the polarizing plate-bonding speed and the liquid crystal display panel-inspection speed, and thus the line speed itself can be increased in a series of feed lines (in a continuous line) for feeding the liquid crystal cell and the liquid crystal display panel (according to the invention, the electrostatic charge on the liquid crystal cell can be quickly attenuated after the bonding of the polarizing plates, so that the non-lighting inspection of the products can be performed for proper quality, even when the line speed is increased so that the time period between the bonding of the polarizing plate and the non-lighting inspection can be reduced. According to the invention, therefore, liquid crystal display panels can be continuously manufactured at high speed in a series of feed lines (in a continuous line) for feeding the liquid crystal cell and the liquid crystal display panel.

Examples of the polarizing plate include (1) a roll of a belt-shaped film including a belt-shaped carrier film and a belt-shaped polarizing plate formed on the belt-shaped carrier film; and (2) a roll of a belt-shaped film including a belt-shaped carrier film and polarizing plates (polarizing plate pieces) formed on the belt-shaped carrier film (a so-called scored polarizing plate roll). In the case of (1), the system of the invention for continuously manufacturing a liquid crystal display panel has cutting means that cut the belt-shaped polarizing plates at predetermined intervals to form polarizing plates (polarizing plate pieces).

The term "continuous line" means a line in which a liquid crystal cell is continuously fed to bonding of polarizing plates (bonding of a first polarizing plate and bonding of a second polarizing plate), an optical inspection (optical inspection of the liquid crystal display panel), and so on.

In an embodiment of the invention, the first polarizing plate bonding means bonds the first polarizing plate to the first substrate of the liquid crystal cell, while it feeds the liquid crystal cell from a feed-in side to a feed-out side along the feed line, the second polarizing plate bonding means bonds the second polarizing plate to the second substrate of the liquid crystal cell, while it feeds the liquid crystal cell from a feed-in side to a feed-out side along the feed line, and the inspection means inspects, in a line mode, the liquid crystal display panel formed by the first polarizing plate bonding means and the second polarizing plate bonding means, while the liquid crystal display panel is fed from the feed-in side to the feed-out side along the feed line.

According to this feature, the electrostatic charge on the panel, which is produce during the bonding of the polarizing plates, can be quickly attenuated, and therefore, when a line inspection is used, the tact time can be reduced with no trouble (when a line inspection is used, the panel can be inspected for proper quality, even when the liquid crystal cell and liquid crystal display panel-feed speed is further increased so that the time period between the bonding of the polarizing plate and the inspection of the panel is further reduced). As a result, high-speed continuous productivity of high-quality liquid crystal display panels can be particularly increased. For example, the line-mode inspection of the liquid crystal display panel being fed can be achieved using light irradiation means for irradiating light to the liquid crystal display panel and a plurality of imaging means for imaging the liquid crystal display panel irradiated with light, which are arranged in a line pattern (linearly) along a direction perpendicular to the feed direction of the liquid crystal display panel. In this configuration, the feed direction of the liquid crystal cell during the bonding of the first polarizing plate and the bonding of the second polarizing plate, and the feed direction of the liquid crystal display panel during the line inspection may be parallel to one another, reverse to one another, or crossing or perpendicular to one another, as long as the liquid crystal cell and the liquid crystal display panel are fed in a direction from the feed-in side (the side where the liquid crystal cell is fed in) to the feed-out side (the side where the liquid crystal display panel is fed out) along the feed line.

In an embodiment of the invention, the inspection means includes: transmitted light inspection means has light irradiation means that is placed on one side of the feed line and irradiates light to one side of the liquid crystal display panel; and imaging means that is placed on another side of the feed line and images the liquid crystal display panel irradiated with the light irradiation means.

According to this feature, light transmitted through the liquid crystal display panel is imaged, so that foreign bodies on the surface, surface scratches, and foreign bodies between the liquid crystal cell and the polarizing plate can be detected as bright spots. According to the invention, the inspection can be performed after the electrostatic charge on the liquid crystal cell is attenuated, and therefore, the inspection can be performed for proper quality. Besides the transmitted light inspection means, the inspection means may further include reflected light inspection means that irradiates light to one side of the liquid crystal display panel from an oblique direction and receives reflected light from the one side of the liquid crystal display panel to optically inspect the liquid crystal display panel. This makes it possible to more reliably detect foreign bodies interposed between the liquid crystal cell and the polarizing plate without lighting the liquid crystal cell itself.

In an embodiment of the invention, the first polarizing plate bonding means includes: a pair of first bonding rollers between which the liquid crystal cell and the first polarizing plate are caught so that the first polarizing plate is bonded to the first substrate of the liquid crystal cell, and the second polarizing plate bonding means includes: a pair of second bonding rollers between which the liquid crystal cell with the first polarizing plate bonded thereto and the second polarizing plate are caught so that the second polarizing plate is bonded to the second substrate of the liquid crystal cell.

According to this feature, the polarizing plates can be bonded to both sides of the liquid crystal cell at higher speed in a continuous manner, and the electrostatic charge on the liquid crystal cell can be quickly attenuated to a level where the inspection is not interfered with, even when the liquid crystal cell is electrostatically charged by the friction between the bonding rollers, which makes the invention particularly effective. It will be understood that one of the rollers may be the same as or different from the other.

The invention is directed to a method for continuously manufacturing an inspected liquid crystal display panel, includes:

a liquid crystal cell feeding step including feeding a liquid crystal cell having a first substrate and a second substrate;

a first polarizing plate providing step including providing a first polarizing plate from a first polarizing plate roll;

a first polarizing plate laminating step including laminating the first polarizing plate to the first substrate;

a second polarizing plate providing step including providing a second polarizing plate from a second polarizing plate roll;

a second polarizing plate laminating step including laminating the second polarizing plate to the second substrate to obtain a liquid crystal display panel after laminating the first polarizing plate to the first substrate; and an inspecting step including optically inspecting the liquid crystal display panel without applying voltage to the liquid crystal panel, wherein the first substrate is less susceptible to electrostatic decay in the liquid crystal cell than the second substrate.

In the invention, the first polarizing plate laminating step, the second polarizing plate laminating step and the inspecting step are performed in a continuous feed line for feeding the liquid crystal cell and the liquid crystal display panel.

Therefore, the order of bonding the polarizing plates is such that the polarizing plate is first bonded to the first substrate of the liquid crystal cell, "which is relatively less susceptible to electrostatic decay," and then the polarizing plate is bonded to the second substrate of the liquid crystal cell, "which is relatively more susceptible to electrostatic decay". In this case, even when the liquid crystal cell is electrostatically charged during the bonding of the polarizing plate, the electrostatic charge on the liquid crystal cell can be quickly attenuated, so that the resulting liquid crystal display panel can be quickly and optically inspected for proper quality (by non-lighting inspection). After the bonding of the polarizing plates, therefore, the liquid crystal display panel can be prevented for waiting for a long time until the electrostatic charge on the liquid crystal cell is attenuated, or there is no need to apply a voltage to the liquid crystal cell (more specifically, the liquid crystal layer) for removal of the electrostatic charge on the liquid crystal cell, so that non-lighting inspection of the liquid crystal display panel can be quickly performed for proper quality. In addition, non-lighting inspection of the liquid crystal display panel does not need to apply a voltage to the liquid crystal cell during the inspection, in contrast to a lighting inspection in which a voltage is applied to the liquid crystal cell, and therefore allows high-speed inspection. Therefore, the inspection of the liquid crystal display panel can be performed at a speed equal to or higher than the polarizing plate-bonding speed, in a series of feed lines (in a continuous line) for feeding the liquid crystal cell and the liquid crystal display panel. As a result, the polarizing plate-bonding speed and the liquid crystal display panel-inspection speed, and thus the line speed itself can be increased in a series of feed lines (in a continuous line) for feeding the liquid crystal cell and the liquid crystal display panel (according to the invention, the electrostatic charge on the liquid crystal cell can be quickly attenuated after the bonding of the polarizing plates, so that the non-lighting inspection of the products can be performed for proper quality, even when the line speed is increased so that the time period between the bonding of the polarizing plate and the non-lighting inspection can be reduced. According to the invention, therefore, liquid crystal display panels can be continuously manufactured at high speed in a series of feed lines (in a continuous line) for feeding the liquid crystal cell and the liquid crystal display panel.

In an embodiment of the invention, the first polarizing plate laminating step includes bonding the first polarizing plate to the first substrate of the liquid crystal cell while feeding the liquid crystal cell from a feed-in side to a feed-out side along the feed line, the second polarizing plate laminating step includes bonding the second polarizing plate to the second substrate of the liquid crystal cell while feeding the liquid crystal cell from a feed-in side to a feed-out side along the feed line, and the inspection step includes inspecting, in a line mode, the liquid crystal display panel formed by the first polarizing plate laminating step and the second polarizing plate laminating step, while feeding the liquid crystal display panel from the feed-in side to the feed-out side along the feed line.

According to this feature, the electrostatic charge on the panel, which is produce during the bonding of the polarizing plates, can be quickly attenuated, and therefore, when a line inspection is used, the tact time can be reduced with no trouble (when a line inspection is used, the panel can be inspected for proper quality, even when the liquid crystal cell and liquid crystal display panel-feed speed is further increased so that the time period between the bonding of the polarizing plate and the inspection of the panel is further reduced). As a result, high-speed continuous productivity of high-quality liquid crystal display panels can be particularly increased.

In an embodiment of the invention, the inspection steps includes: a transmitted light inspection step comprising irradiating light to one side of the liquid crystal display panel and receiving, at another side of the liquid crystal display panel, light transmitted through the liquid crystal display panel to inspect the liquid crystal display panel. Besides the transmitted light inspection step, the inspection step may further include a reflective light inspection step which includes irradiating light to one side of the liquid crystal display panel from an oblique direction and receiving reflected light from the one side of the liquid crystal display panel to optically inspect the liquid crystal display panel.

In an embodiment of the invention, the first polarizing plate laminating step includes catching, between a pair of first bonding rollers, the liquid crystal cell and the first polarizing plate to bond the first polarizing plate to the first substrate of the liquid crystal cell, and the second polarizing plate laminating step includes catching, between a pair of second rollers, the liquid crystal cell with the first polarizing plate bonded thereto and the second polarizing plate to bond the second polarizing plate to the second substrate of the liquid crystal cell.

In the system and method of the invention for continuously manufacturing a liquid crystal display panel, the first polarizing plate preferably has an electrically-conductive layer. The electrically-conductive layer preferably has a surface resistance of $1.0 \times 10^{12}$ Ω/square or less. When an electrically-conductive layer is provided in the first polarizing plate, the first substrate (liquid crystal cell) can be inhibited from being electrostatically charged during the bonding of the first and the second polarizing plates, so that any electrostatic charge on the liquid crystal cell can be more quickly attenuated. In the system and method of the invention for continuously manufacturing a liquid crystal display panel, the second polarizing plate also preferably has an electrically-conductive layer. The electrically-conductive layer also preferably has a surface resistance of $1.0 \times 10^{12}$ Ω/square or less. When an electrically-conductive layer is provided in the second polarizing plate, the second substrate (liquid crystal cell) can be inhibited from being electrostatically charged during the bonding of the second polarizing plate, so that any electrostatic charge on the liquid crystal cell can be more quickly attenuated.

The liquid crystal display panel includes the liquid crystal cell and at least the first and the second polarizing plates bonded to both surfaces of the liquid crystal cell, in which a driving circuit is incorporated as needed. The liquid crystal cell to be used may be of any type such as a vertical alignment (VA) type, an in-plane switching (IPS) type, a twisted nematic (TN) type, or a super twisted nematic (STN) type.

For example, the polarizing plate generally includes a polarizer (about 10 to 30 μm in thickness) and a polarizer-protecting film or films (about 20 to 80 μm in thickness) formed on one or both sides of the polarizer with an adhesive or a pressure-sensitive adhesive interposed therebetween.

The polarizing plate may include an additional film such as a retardation film (20 to 80 µm in thickness), a viewing angle compensation film, a brightness enhancement film, or a surface protecting film (about 20 to 50 µm in thickness). These films may also be stacked through an adhesive or a pressure-sensitive adhesive. The polarizing plate generally includes a pressure-sensitive adhesive layer for bonding the polarizing plate to a liquid crystal cell. A pressure-sensitive adhesive such as an acrylic pressure-sensitive adhesive or a silicone pressure-sensitive adhesive may be used to form the pressure-sensitive adhesive layer. The pressure-sensitive adhesive layer typically has a thickness of 10 to 40 µm. In general, a (belt-shaped) carrier film (also called "release film") is attached to the pressure-sensitive adhesive layer so that the surface of the pressure-sensitive adhesive layer can be protected until the polarizing plate is bonded to a liquid crystal cell. The polarizing plate typically has a thickness in the range of 50 µm to 400 µm.

A known conventional film such as a plastic film (for example, a polyethylene terephthalate film) may be used as the (belt-shaped) carrier film (generally 20 to 50 µm in thickness). If necessary, an appropriate film coated with an appropriate release agent such as a silicone release agent, a long-chain alkyl release agent, a fluoride release agent, or molybdenum sulfide may also be used according to conventional techniques.

BRIEF DESCRIPTION OF THE DRAWINGS

FIG. 6B is a diagram showing the process flow of the line inspection;

FIG. 7B is a diagram showing the process flow of the area inspection.

DETAILED DESCRIPTION OF THE PREFERRED EMBODIMENTS

Embodiment 1

Figure 1:
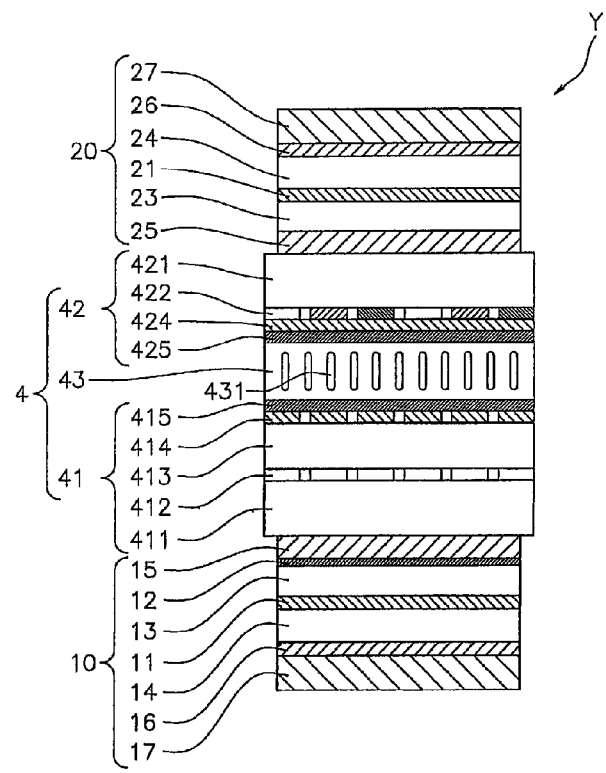
FIG. 1 is a schematic cross-sectional view of a liquid crystal display panel in embodiment 1.

FIG. 1 shows a schematic cross-sectional view of a liquid crystal display panel Y. The liquid crystal display panel Y includes a rectangular liquid crystal cell 4 including a liquid crystal layer 43 placed between a pair of first and second substrates 41 and 42; a first polarizing plate 10 placed on the first substrate 41 side of the liquid crystal cell 4; and a second polarizing plate 20 placed on the second substrate 42 side of the liquid crystal cell 4.

Liquid Crystal Cell

In this embodiment, a vertical alignment-type (hereinafter referred to as "VA-type") liquid crystal cell is used as the liquid crystal cell 4. The VA-type liquid crystal cell 4 is described below.

The first substrate 41 (hereinafter also referred to as the backside substrate) placed on the backside (backlight side) of the liquid crystal cell 4 includes a transparent substrate 411 of glass, plastic or the like; a circuit part that is provided on the transparent substrate 411 and includes a plurality of gate wirings and a plurality of source wirings arranged perpendicular to the gate wirings and provided on the gate wirings with an insulating film interposed therebetween; thin film transistors (TFT) 412 provided as a plurality of switching elements at the intersections of the gate wirings and the source wirings; an interlayer insulating film 413 provided on the switching elements (thin film transistors); a plurality of transparent electrodes (pixel electrodes) 414 provided on the interlayer insulating film 413 and connected to the switching elements (thin film transistors 412), respectively, through contact holes formed in the interlayer insulating film 413; and an alignment film 415 provided on the transparent electrodes (pixel electrodes) 414.

The thin film transistors 412 each include a gate electrode, a semiconductor layer opposed to the gate electrode with a gate insulating film interposed therebetween, and source and drain electrodes independently connected to the semiconductor layer. The gate wiring is connected to the gate electrode, the source wiring is connected to the source electrode, and the pixel electrode 414 is connected to the drain electrode.

The gate wiring and gate electrode, the source wiring and source electrode, and the drain electrode are typically formed by a process including forming a metal film such as a titanium, chromium, aluminum, or molybdenum film, a film of an alloy thereof, or a laminated film thereof by sputtering or the like, and then patterning the film by photo-etching or the like.

For example, the semiconductor layer is formed by a process including forming a film of a semiconductor material such as amorphous silicon or polysilicon by plasma CVE (Chemical Vapor Deposition) or the like and then patterning the film by photo-etching or the like.

For example, the pixel electrodes 414 are formed by a process including forming a film of a transparent electrically-conductive material such as indium tin oxide (ITO), indium zinc oxide, tin oxide, or zinc oxide by sputtering or the like and then pattering the film by photo-etching or the like.

For example, the alignment film 415 is formed by a process including applying polyimide resin to form a film and rubbing the film.

On the other hand, in embodiment 1, the second substrate 42 (hereinafter also referred to as the display surface side substrate) placed on the image display side of the liquid crystal cell 4 includes a transparent substrate 421; a color filter 422 provided on the transparent substrate 421; an overcoat layer (not shown) provided on the color filter 422; a transparent electrode (common electrode) 424 provided on the overcoat layer and opposed to the pixel electrodes 414; and an alignment film 425 provided on the transparent electrode (common electrode) 424.

The color filter 422 to be used is preferably configured to include a black matrix for shielding light between colored patterns, and red, green and blue colored layers each corresponding to each pixel.

For example, the black matrix is made of chromium metal and has a thickness of 100 to 150 nm. For example, the colored layers used are made of a resin material colored with a dye or a pigment and have a thickness of 1 to 3 µm. The pixel pattern arrangement used for the colored layers may be a delta arrangement, a mosaic arrangement, or a stripe arrangement. For example, the overcoat layer is made of acrylic resin, epoxy resin, or the like and has a thickness of 0.5 to 2 µm.

Examples of the method for manufacturing the color filter 422 include, but are not limited to, a staining method, a pigment dispersion method, a printing method, and an electro-deposition method.

For example, the common electrode 424 is formed by a process including forming a film of a transparent electrically-conductive material such as indium tin oxide (ITO), indium zinc oxide, tin oxide, or zinc oxide by sputtering or the like, and then pattering the film by photo-etching or the like.

For example, the liquid crystal layer 43 of the liquid crystal cell 4 is made of a nematic liquid crystal molecule 431 having negative dielectric anisotropy ($\Delta\varepsilon<0$). The liquid crystal layer 43 is driven by a voltage applied in a direction substantially perpendicular to the substrate surface between the pixel electrode 414 of the backside substrate 41 (first substrate 41) and the common electrode 424 of the display surface side substrate 42 (second substrate 42). Therefore, when the voltage is less than the threshold voltage, the long axis of the liquid crystal molecule is oriented substantially perpendicular to the substrate surface, so that linearly polarized light incident on the back side does not undergo a birefringence effect when passing through the liquid crystal layer 43 and therefore cannot pass through the second polarizer 21 of the second polarizing plate 20 on the display surface side. When the voltage becomes the threshold voltage or more, the long axis of the liquid crystal molecule 431 is tilted at a certain angle depending on the magnitude of the voltage with respect to the substrate surface, so that linearly polarized light incident on the back side undergoes a birefringence effect when passing through the liquid crystal layer 43 and therefore can partially pass through the second polarizer 21 of the second polarizing plate 20 on the display surface side.

In the liquid crystal cell 4, because of the substrate structure described above, the backside substrate 41 is less susceptible to electrostatic decay (potential decay) after it is electrostatically charged, while the display surface side substrate 42 is more susceptible to electrostatic decay (potential decay) than the backside substrate 41 after it is electrostatically charged. Therefore, when the VA-type liquid crystal cell 4 is used, the backside substrate 41 is a substrate (first substrate) to which a polarizing plate should be bonded first, and the display surface side substrate 42 is a substrate (second substrate) to which a polarizing plate should be bonded subsequently.

The liquid crystal cell 4 is not restricted to a VA type, and it is considered that a TN (Twisted Nematic) type, a STN (Super-Twisted Nematic) type, or an OCB (Optically Compensated Birefringence) type also shows the same tendency, because similarly to the VA type, they have a backside substrate containing pixel electrodes, a display surface side substrate containing a common electrode, and a liquid crystal layer that is driven by a voltage applied in a direction substantially perpendicular to the substrate surface between the pixel electrode and the common electrode. Also in the case of a TN, STN or OCB type, therefore, it is considered to be necessary to bond a polarizing plate first to the backside substrate and then to bond a polarizing plate to the display surface side substrate as in the case of the VA type, so that the effects of the invention can be obtained. Which of the backside substrate or the display surface side substrate corresponds to the first or the second substrate may be determined by the method described below.

Polarizing Plates

The first polarizing plate 10 includes at least a first polarizer 11 (having an absorption axis in a direction parallel to the short side of the liquid crystal cell 4). The first polarizing plate 10 includes the first polarizer 11; first and second protective films 13 and 14 placed on both sides of the first polarizer 11, wherein the first protective film is closer to the liquid crystal cell; a first electrically-conductive layer 12 placed on the inner side of the first protective film 13; a first pressure-sensitive adhesive layer 15 for bonding the first polarizing plate 10 to the first substrate 41 of the liquid crystal cell 4; and a first surface protecting film 17 placed on the second protective film 14 with a first weak pressure-sensitive adhesive layer 16 interposed therebetween.

The first polarizer 11 to be used may be any known conventional polarizer, and for example, a polyvinyl alcohol film with an iodine complex or a dichroic dye adsorbed thereon is preferably used. For example, the first protective film 13 and the second protective film 14 to be used are each preferably, but not limited to, a film made of triacetylcellulose resin, polyester resin, polycarbonate resin, cyclic polyolefin resin, (meth)acrylic resin, or the like.

The first electrically-conductive layer 12 preferably has a surface resistance of $1.0\times10^{12}$ Ω/square or less, more preferably $1.0\times10^{11}$ Ω/square or less. When the first electrically-conductive layer is provided, the electrostatic charging of the first substrate (liquid crystal cell) can be suppressed during the bonding of the first and second polarizing plates, so that the electrostatic charge on the liquid crystal cell can be more quickly attenuated. The surface resistance may be measured by the method as shown in examples below. An electrically-conductive layer is not necessarily formed in the first polarizing plate, and the effects of the invention can be obtained even when a polarizing plate with no electrically-conductive layer formed therein is bonded to the liquid crystal cell. It will be understood that the first electrically-conductive layer is formed at any location in the first polarizing plate, specifically, at any location from the first surface protecting film to the first pressure-sensitive adhesive layer.

The material of the first electrically-conductive layer 12 is not restricted. The first electrically-conductive layer 12 may be made of a metal oxide such as ITO (Indium Tin Oxide) composed mainly of indium oxide and doped with tin oxide; an electrically-conductive polymer such as polyacetylene, polypyrrole, polythiophene, or polyphenylene vinylene; the electrically-conductive polymer and a halogen or a halide added thereto; or an ionic surfactant.

The method of forming the first electrically-conductive layer 12 is also not restricted. For example, the first electrically-conductive layer 12 of a metal oxide is preferably formed using vapor phase deposition such as sputtering, vacuum deposition, ion plating, or plasma CVD, and the first electrically-conductive 12 of an electrically-conductive polymer may be formed using a known conventional coating method such as bar coating, blade coating, spin coating, reverse coating, die coating, or spraying.

The first electrically-conductive layer 12 preferably has a thickness of 100 nm to 300 nm.

The second polarizing plate 20 includes at least a second polarizer 21 (having an absorption axis in a direction parallel to the long side of the liquid crystal cell 4). In this embodiment, the second polarizing plate 20 includes the second polarizer 21; third and fourth protective films 23 and 24 placed on both the inner and outer sides of the second polarizer 21; a second pressure-sensitive adhesive layer 25 for bonding the second polarizing plate 20 to the second substrate 42 of the liquid crystal cell 4; and a second surface protecting film 27 placed on the second protective film 24 with a second weak pressure-sensitive adhesive layer 26 interposed therebetween.

While the second polarizing plate 20 may or may not have an electrically-conductive layer, it preferably has an electrically-conductive layer (second electrically-conductive layer) in order to suppress the electrostatic charging of the second substrate 42 (liquid crystal cell) during the bonding of the second polarizing plate and to attenuate the electrostatic charge on the liquid crystal cell 4 more quickly. The structure of such an electrically-conductive layer may be the same as that of the first electrically-conductive layer.

Besides the layers described above, the first or second polarizing plate may further include any other layer having an optical function, a physical function or any other function, such as a brightness enhancement layer, a retardation layer, or an anti-reflection layer, as needed.

Continuous Manufacturing System

A system for continuously manufacturing the liquid crystal display panel Y is described with reference to FIG. 2.

The system according to this embodiment for continuously manufacturing the liquid crystal display panel includes liquid crystal cell supply means 50, first polarizing plate supply means 100*a*, first polarizing plate bonding means 100*b*, liquid crystal cell feed means 60, second polarizing plate supply means 200*a*, second polarizing plate bonding means 200*b*, liquid crystal display panel feed means 70, and inspection means 80. In this embodiment, the liquid crystal cell supply means 50, the liquid crystal cell feed means 60, and the liquid crystal display panel feed means 70 form a continuous line 300, which includes a series of lines for feeding the liquid crystal cell and the liquid crystal display panel, and the bonding means (first polarizing plate bonding means 100*b* and second polarizing plate bonding means 200*b*) and the inspection means 80 are arranged in the continuous line 300.

Liquid Crystal Cell Supply Means

The liquid crystal cell supply means 50 supplied the liquid crystal cell 4 to the first polarizing plate bonding means 100*b*. In this embodiment, the liquid crystal cell supply means 50 only includes a feeding mechanism 510, but such a configuration is non-limiting.

First Polarizing Plate Supply Means

The first polarizing plate supply means 100*a* feeds a first belt-shaped film 61 from a first polarizing plate roll 6, which is a roll of the first belt-shaped film 61 including a first belt-shaped carrier film 62 and a first belt-shaped polarizing plate formed on the first belt-shaped carrier film 62, cuts the first belt-shaped polarizing plate at predetermined intervals to form a first polarizing plate 10, peels off the first polarizing plate 10 from the first belt-shaped carrier film 62 by folding back the first belt-shaped carrier film 62, and supplies the first polarizing plate 10 to the first polarizing plate bonding means 100*b*. For the operation, the first polarizing plate supply means 100*a* includes first cutting means 130, first peeling means 140, and first take-up means 160.

The first cutting means 130 cuts the first belt-shaped polarizing plate at predetermined intervals to form the first polarizing plate 10 on the first belt-shaped carrier film 62. The first cutting means 130 may be configured to cut the first belt-shaped polarizing plate, which has a width corresponding to the long side of the first substrate 41 of the liquid crystal cell 4, into a length corresponding to the short side of the first substrate 41 of the liquid crystal cell 4, or configured to cut the first belt-shaped polarizing plate, which has a width corresponding to the short side of the first substrate 41 of the liquid crystal cell 4, into a length corresponding to the long side of the first substrate 41 of the liquid crystal cell 4. In this embodiment, the first cutting means 130 is configured to cut the first belt-shaped polarizing plate, which has a width corresponding to the long side of the first substrate 41 of the liquid crystal cell 4, into a length corresponding to the short side of the first substrate 41 of the liquid crystal cell 4. For example, the first cutting means 130 may be a cutter, a laser, or the like.

The first peeling means 140 inwardly folds back the first belt-shaped carrier film 62 to peel off the first polarizing plate 10 from the first belt-shaped carrier film 62. In this embodiment, a sharp-ended knife edge part is used as a non-limiting example of the first peeling means 140.

The first take-up means 160 takes up the belt-shaped carrier film 62 from which the first polarizing plate 10 is peeled off.

First Polarizing Plate Bonding Means

The first polarizing plate bonding means 100*b* bonds the first polarizing plate 10 to the first substrate 41 of the liquid crystal cell 4, wherein the liquid crystal cell 4 is supplied by the liquid crystal cell supply means 50, and the first polarizing plate 10 is supplied by the first polarizing plate supply means 100*a*. In this embodiment, the first polarizing plate bonding means 100*b* includes a pair of bonding rollers (first bonding rollers) 150*a* and 150*b*.

Liquid Cell Feed Means

The liquid crystal cell feed means 60 transports and supplies, to the second polarizing plate bonding means 200*b*, the liquid crystal cell 4 with the first polarizing plate 10 bonded thereto by the first polarizing plate bonding means 100*b*. In this embodiment, the liquid crystal cell feed means 60 has a turning mechanism (not shown) for horizontally turning by 90° the liquid crystal cell 4 with the first polarizing plate 10 bonded thereto. The liquid crystal cell feeding mechanism 60 may have a turnover mechanism for turning over the liquid crystal cell 4 with the first polarizing plate 10 bonded thereto. Alternatively, the liquid crystal cell feeding mechanism 60 may include only a mechanism for feeding the liquid crystal cell 4 with the first polarizing plate 10 bonded thereto.

Second Polarizing Plate Supply Means

The second polarizing plate supply means 200*a* feeds a second belt-shaped film 71 from a second polarizing plate roll 7, which is a roll of the second belt-shaped film 71 including a second belt-shaped carrier film 72 and a second belt-shaped polarizing plate formed on the second belt-shaped carrier film 72, cuts the second belt-shaped polarizing plate at predetermined intervals to form a second polarizing plate 20, peels off the second polarizing plate 20 from the second belt-shaped carrier film 72 by folding back the second belt-shaped carrier film 72, and supplies the second polarizing plate 20 to the second polarizing plate bonding means 200*b*. The second polarizing plate supply means 200*a* includes second cutting means 230, second peeling means 240, and second take-up means 260. The second cutting means 230 has the same configuration as the first cutting means, the second peeling means has the same configuration as the first peeling means, and the second take-up means has the same configuration as the first take-up means. In this embodiment, the second cutting means 230 is configured to cut the second belt-shaped polarizing plate, which has a width corresponding to the short side of the second substrate 42 of the liquid crystal cell 4, into a length corresponding to the long side of the second substrate 42 of the liquid crystal cell 4.

Second Polarizing Plate Bonding Means

The second polarizing plate bonding means 200*b* bonds the second polarizing plate 20 to the second substrate 42 of the liquid crystal cell 4 to form a liquid crystal display panel Y, wherein the liquid crystal cell 4 is supplied by the liquid crystal cell feed means 60, and the second polarizing plate 20 is supplied by the second polarizing plate supply means 200*a*. In this embodiment, the second polarizing plate bonding means 200*b* includes a pair of bonding rollers (second bonding rollers) 250*a* and 250*b*.

Liquid Crystal Display Panel Feed Means

The liquid crystal display panel feed means 70 feeds the liquid crystal display panel Y, which is formed by the second polarizing plate bonding means 200b.

Inspection Means

The inspection means 80 optically inspects the liquid crystal display panel Y, which is fed by the liquid crystal display panel feed means 70, without applying a voltage to the liquid crystal display panel Y (more specifically, the liquid crystal layer 43). In this embodiment, the inspection means 80 includes a transmitted light inspection means having a light source (light irradiation means) 31 that is placed on one side of the liquid crystal display panel feed means 70 (on a lower side in the case shown in FIG. 2) to irradiate light to the lower surface of the liquid crystal display panel Y; and a CCD camera (imaging means) 33 that is placed on the other side of the liquid crystal display panel 70 (on an upper side in the case shown in FIG. 2) to image the liquid crystal display panel Y irradiated with the light source (light irradiation means) 31. The presence or absence of foreign matter or air voids interposed between the polarizing plate and the liquid crystal cell is determined based on the amount of transmitted light detected by the CCD camera (imaging means) 33. Besides the transmitted light inspection means, the inspection means 80 may further include reflected light inspection means for optically inspecting the liquid crystal display panel Y by irradiating light to one side of the liquid crystal display panel Y and detecting light reflected from the one side of the liquid crystal display panel Y. After the second polarizing plate is bonded, the inspection means 80 is preferably placed within 1 minute, more preferably within 40 seconds, even more preferably within 20 seconds, in particular, preferably within 10 seconds, in the position where the inspection will be started.

For example, the inspection means 80 may be configured as line inspection means 81 or area inspection means 82. The line inspection means 81 is described with reference to FIGS. 6A and 6B. The line inspection means 81 includes a light source (light irradiation means) 811 that is placed on one side of the liquid crystal display panel feed means 70 (on a lower side in the case shown in FIG. 6A) to irradiate light to the lower surface of the liquid crystal display panel Y; a light receiving sensor (imaging means) 812 that is placed on the other side of the liquid crystal display panel feed means 70 (an upper side in the case shown in FIG. 6A) to image the liquid crystal display panel Y in a line mode, wherein the liquid crystal display panel Y is being irradiated with the light source (light irradiation means) 811 and being fed by the liquid crystal display panel feed means 70 in a direction from the feed-in side to the feed-out side along the feed line; an image processing unit 813 that sequentially stores, in a memory, line image date taken by the light receiving sensor 812 and performs image processing on a group of line image data stored in the memory; a control unit 814 that determines the presence or absence of defects such as foreign bodies or air voids interposed between the polarizing plate and the liquid crystal cell based on the image date having undergone image processing in the image processing unit 813; and a storage unit 815 that stores the result of the determination in the control unit 814 (whether the product is normal or defective) together with identification information about the liquid crystal display panel.

Figure 6A:
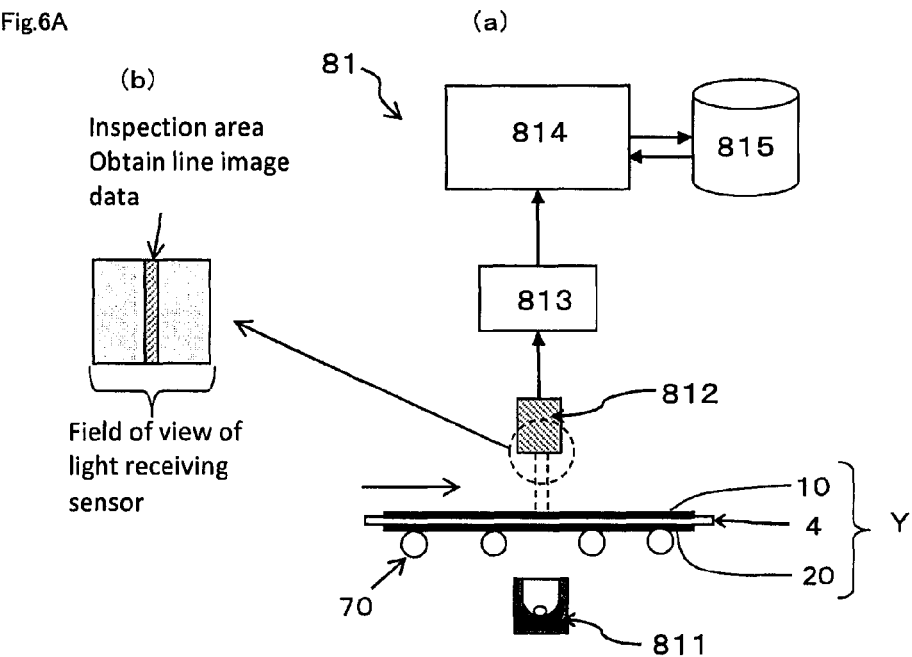
FIG. 6A is a diagram for illustrating a line inspection.
Figure 6A:
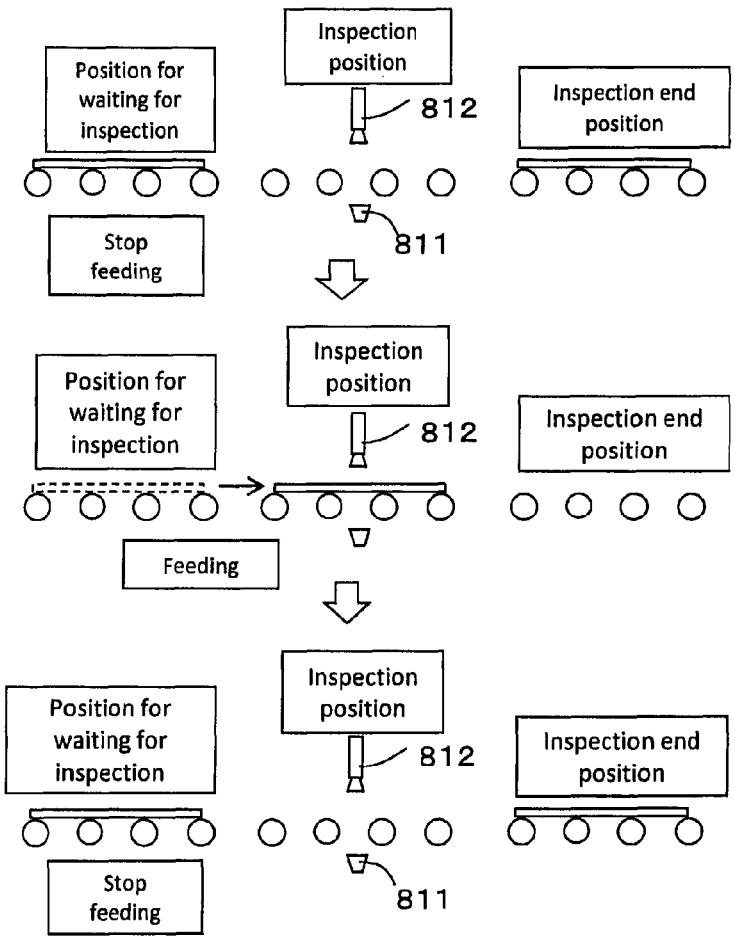

A specific inspection process is described with reference to the process flow shown in FIG. 6B. First, the liquid crystal display panel Y is stopped at a position for waiting for the inspection (see "Position for waiting for inspection" in part (c) of FIG. 6A). The control unit 814 controls the liquid crystal display panel feed means 70 for feeding the liquid crystal display panel Y to start the feeding of the liquid crystal display panel Y (S1) and the inspection by the line inspection means 81 (S2). The light receiving sensor 812 is arranged to extend in a line shape (linearly) in a direction perpendicular to the feed direction of the liquid crystal display panel Y and images, in a line mode, the liquid crystal display panel Y being fed in a direction from the feed-in side to the feed-out side along the feed line (S3) (see Inspection position in part (c) of FIG. 6A). The light receiving sensor 812 takes a line-shaped image of the transmitted light produced by the light source 811. Referring to part (b) of FIG. 6A, the normal field of view of the light receiving sensor 812 is narrowed to form an inspection area so that line image date can be obtained. The image processing unit 813 sequentially stores, in the memory (not shown), the line image data taken by the light receiving sensor 812. The liquid crystal display panel Y is fed to the inspection end position (see Inspection end position in part (c) of FIG. 6A) and stopped (S5). The amount of the feed has been previously determined, and the liquid crystal display panel feed means 70 performs intermittent feeding. The image processing unit 813 then performs image processing on a group of the line image data stored in the memory (S6). The control unit 814 determines the presence or absence of defects such as foreign bodies or air voids interposed between the polarizing plate and the liquid crystal cell based on the image data having undergone the image processing in the image processing unit 813 (S7). When the control unit 814 determines the product to be normal, the control unit 814 stores, in the storage unit 815, the information that the liquid crystal display panel Y is determined to be a normal product (S8). The liquid crystal display panel Y determined to be a normal product is fed to a non-defective product port (S9). On the other hand, when the product is determined to be defective by the control unit 814, the control unit 814 stores, in the storage unit 815, the information that the liquid crystal display panel Y is determined to be a defective product (S10). The liquid crystal display panel Y determined to be a defective product is fed to a defective product port (S11).

Figure 7A:
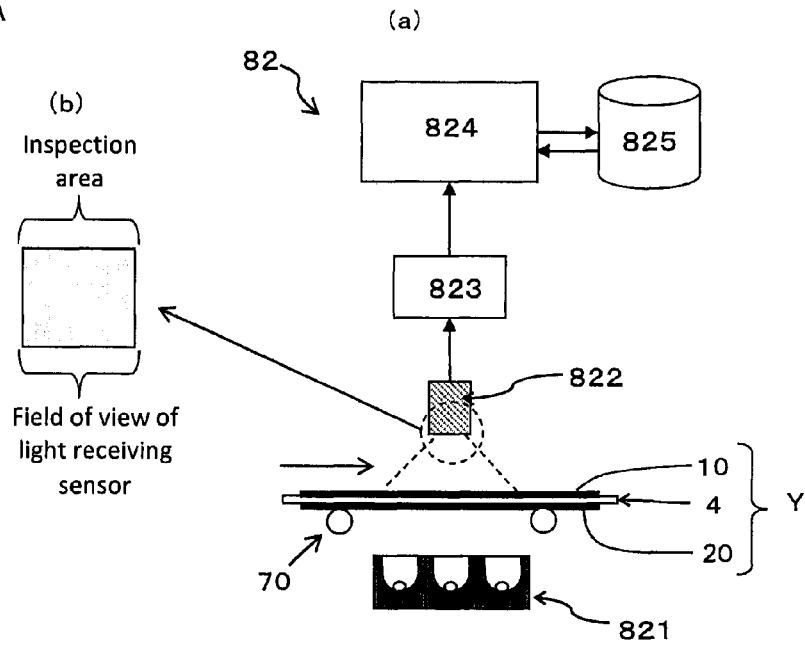
FIG. 7A is a diagram for illustrating an area inspection.
Figure 7A:
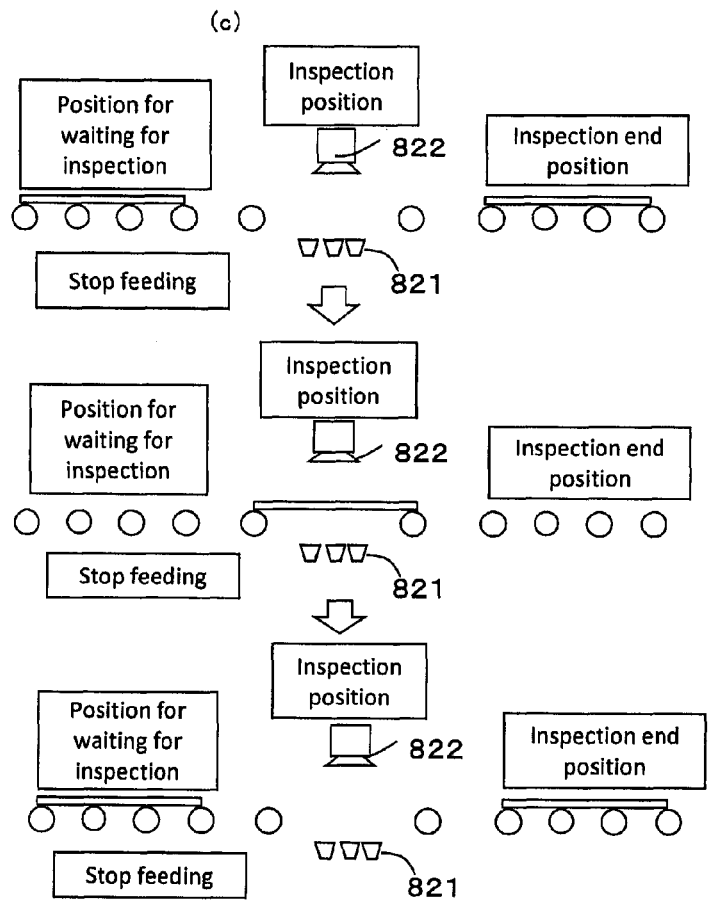

Next, a description is given of the area inspection means 82 with reference to FIGS. 7A and 7B. The area inspection means 82 includes a light source (light irradiation means) 821 that is placed on one side of the liquid crystal display panel feed means 70 (on a lower side in the case shown in FIG. 7A) to irradiate light to the lower surface of the liquid crystal display panel Y; a light receiving sensor (imaging means) 822 that is placed on the other side of the liquid crystal display panel feed means 70 (an upper side in the case shown in FIG. 7A) to image the liquid crystal display panel Y irradiated with the light source (light irradiation means) 821; an image processing unit 823 that stores, in a memory, image date taken by the light receiving sensor 822 and performs image processing on the image data stored in the memory; a control unit 824 that determines the presence or absence of defects such as foreign bodies or air voids interposed between the polarizing plate and the liquid crystal cell based on the image date having undergone image processing in the image processing unit 823; and a storage unit 825 that stores the result of the determination in the control unit 824 (whether the product is normal or defective) together with identification information about the liquid crystal display panel.

A specific inspection process is described with reference to the process flow shown in FIG. 7B. First, the liquid crystal display panel Y is stopped at a position for waiting for the inspection (see "Position for waiting for inspection" in part (c) of FIG. 7A). The control unit 824 controls the liquid crystal display panel feed means 70 for feeding the liquid crystal display panel Y to start the feeding of the liquid crystal display panel Y (S21) to the inspection position and to stop the liquid crystal display panel Y at the inspection position (S22). The light receiving sensor 822 images the liquid crystal display panel Y being stopped (S23) (see Inspection position in part (c) of FIG. 7A). As shown in part (b) of FIG. 7A, the light receiving sensor 822 takes, in a large inspection area, an image of the transmitted light produced by the light source 821. For example, when the liquid crystal display panel as the inspection object is too large, partial imaging may be performed plural times using a single light receiving sensor. In this case, the light receiving sensor may be shifted and stopped for imaging as needed, or the liquid crystal display panel Y may be shifted and stopped for imaging as needed. In an alternative method, a plurality of light receiving sensors may be placed so that the liquid crystal display panel can be imaged in parts across the area to be imaged. The image processing unit 823 stores, in the memory (not shown), the image data taken by the light receiving sensor 822 (S24). The image processing unit 823 performs image processing on the image data stored in the memory (S25). The control unit 824 determines the presence or absence of defects such as foreign bodies or air voids interposed between the polarizing plate and the liquid crystal cell based on the image data having undergone the image processing in the image processing unit 823 (S26). When the control unit 824 determines the product to be normal, the control unit 824 stores, in the storage unit 825, the information that the liquid crystal display panel Y is determined to be a normal product (S27). After the determination process, the liquid crystal display panel Y is fed to the inspection end position (see Inspection end position in part (c) of FIG. 7A) and stopped. The amount of the feed has been previously determined, and the liquid crystal display panel feeding means 70 performs intermittent feeding. The liquid crystal display panel Y determined to be a normal product is then fed to a non-defective product port (S28). On the other hand, when any defect is detected, the control unit 824 calculates the position of the defect (S29), stores the position of the defect in the storage unit 825 (S30), and determines the liquid crystal display panel Y to be a defective product (S31). After the determination process, the liquid crystal display panel Y is fed to the inspection end position (see Inspection end position in part (c) of FIG. 7A) and stopped. Subsequently, the liquid crystal display panel Y determined to be a defective product is fed to a defective product port (S32).

The system according to this embodiment for continuously manufacturing a liquid crystal display panel is configured to first bond the first polarizing plate, which has an electrically-conductive layer, to the first substrate (backside substrate), which is less susceptible to electrostatic decay after it is electrostatically charged, and then bond the second polarizing plate to the second substrate (display surface side substrate) which is more susceptible to electrostatic decay after it is electrostatically charged. Therefore, the electrostatic charge on the liquid crystal cell can be quickly attenuated when the first and second polarizing plates are bonded, so that the inspection (non-lighting inspection) of the liquid crystal display panel can be quickly performed without the adverse effect of the electrostatic charge on the liquid crystal cell after the bonding of the polarizing plates. As a result, high-quality VA-type liquid crystal display panels can be continuously manufactured at high speed, which makes it possible to substantially increase the production efficiency. In addition, there is no need to perform re-inspection, which makes it possible to reduce the number of processes and to make the process control simpler than conventional techniques. The liquid crystal display panel manufacturing line can also be shortened.

Continuous Manufacturing Method

The method according to this embodiment for continuously manufacturing a liquid crystal display panel includes: a bonding step including sequentially bonding a first polarizing plate and a second polarizing plate to both surfaces of a liquid crystal cell to form a liquid crystal display panel, wherein the first and second polarizing plates are drawn and supplied from a first polarizing plate roll and a second polarizing plate roll, respectively; and an inspection step including optically inspecting the liquid crystal display panel formed in the bonding step, wherein the bonding step and the inspection step are performed in a series of feed lines for feeding the liquid crystal cell and the liquid crystal display panel (in a continuous line). The bonding step includes: a first polarizing plate bonding step including bonding the first polarizing plate to a first substrate of the liquid crystal cell, wherein the first substrate is relatively less susceptible to electrostatic decay; and a second polarizing plate bonding step including bonding the second polarizing plate to a second substrate of the liquid crystal cell, wherein the second substrate is relatively more susceptible to electrostatic decay. In this embodiment, the first polarizing plate bonding step is followed by the second polarizing plate bonding step. The inspection step also includes optically inspecting the liquid crystal display panel, which is formed by the first and second polarizing plate bonding steps, without applying a voltage to the liquid crystal display panel (non-lighting inspection step). The first polarizing plate bonding step and the second polarizing plate bonding step preferably include sequentially bonding the first polarizing plate and the second polarizing plate to the liquid crystal cell, while feeding the liquid crystal cell in a direction from the feed-in side to the feed-out side along the feed line. The inspection step preferably includes performing the inspection in a line mode, while feeding the liquid crystal display panel, which is formed by the bonding steps, in a direction from the feed-in side to the feed-out side along the feed line.

First Polarizing Plate Bonding Step

In the first polarizing plate bonding step, the first polarizing plate drawn and supplied from the first polarizing plate roll is bonded to the first substrate of the liquid crystal cell. In this embodiment, a first belt-shaped film 61 is first drawn from a first polarizing plate roll 6, which is a roll of the first belt-shaped film 61 including a first belt-shaped carrier film 62 and a first belt-shaped polarizing plate formed on the first belt-shaped carrier film 62. Subsequently, the first belt-shaped polarizing plate is cut, while the first belt-shaped carrier film 62 is left (uncut), so that a first polarizing plate 10 is formed on the first belt-shaped carrier film 62. Subsequently, the first polarizing plate 10 is peeled off from the first belt-shaped carrier film 62, for example, by hooking and reversing (backward feeding) the first belt-shaped carrier film 62. Subsequently, the first polarizing plate 10 from which the first belt-shaped carrier film 62 is peeled off (or from which the first belt-shaped carrier film 62 is being peeled off) is bonded to the first substrate 41 of the liquid crystal cell 4.

Second Polarizing Plate Bonding Step

In the second polarizing plate bonding step, the second polarizing plate drawn and supplied from the second polarizing plate roll is bonded to the second substrate of the liquid crystal cell. In this embodiment, a second belt-shaped film 71 is first drawn from a second polarizing plate roll 7, which is a roll of the second belt-shaped film 71 including a second belt-shaped carrier film 72 and a second belt-shaped polarizing plate formed on the second belt-shaped carrier film 72. Subsequently, the second belt-shaped polarizing plate is cut, while the second belt-shaped carrier film 72 is left (uncut), so that a second polarizing plate 20 is formed on the second belt-shaped carrier film 72. Subsequently, the second polarizing plate 20 is peeled off from the second belt-shaped carrier film 72, for example, by hooking and reversing (backward feeding) the second belt-shaped carrier film 72. Subsequently, the second polarizing plate 20 from which the second belt-shaped carrier film 72 is peeled off (or from which the second belt-shaped carrier film 72 is being peeled off) is bonded to the second substrate 42 of the liquid crystal cell 4 to form a liquid crystal display panel Y.

Inspection Step

In the inspection step, the liquid crystal display panel Y formed by the bonding steps (the first polarizing plate bonding step and the second polarizing plate bonding step) is optically inspected with no voltage applied to the liquid crystal display panel Y (the liquid crystal cell, more specifically, the liquid crystal layer 43). In this embodiment, light is irradiated to one side of the liquid crystal display panel Y, and light transmitted through the liquid crystal display panel Y is received at the other side of the liquid crystal display panel Y so that a transmitted light inspection step can be performed to optically inspect the liquid crystal display panel Y.

In this embodiment, the bonding steps (the first polarizing plate bonding step and the second polarizing plate bonding step) and the inspection step are performed in a series of feed lines for feeding the liquid crystal cell and the liquid crystal display panel (in a continuous line). In the bonding steps, the electrostatic charging of the liquid crystal cell 4 is inevitable. In this embodiment, however, the first polarizing plate bonding step is followed by the second polarizing plate bonding step, so that the electrostatic charge on the liquid crystal cell 4 can be quickly attenuated. As a result, in the continuous line, the optical inspection (non-lighting inspection) of the liquid crystal display panel Y can be quickly performed without the influence of the electrostatic charge on the liquid crystal cell 4 after the bonding of the polarizing plates, so that high-quality liquid crystal display panels Y can be continuously manufactured at high speed.

When the line inspection means 81 or the area inspection means 82 is used, the inspection step can be performed as a line inspection step or an area inspection step. Particularly to improve the high-speed continuous productivity of high-quality liquid crystal display panels, the inspection step is preferably performed as a line inspection step.

Although the mechanism of how the invention is effective is not clear, it is considered that in the VA-type liquid crystal cell for this embodiment, the backside substrate (first substrate) is less susceptible to electrostatic decay, once it is electrostatically charged, so that the electrostatic charge produced by the friction with a supporting roller remains on the liquid crystal cell, because the backside substrate (first substrate) has switching elements (thin film transistors) between the circuit part such as gate wiring and the pixel electrodes.

Specifically, in the backside substrate (first substrate), the electrostatic charge accumulated on the surface of the substrate by electrostatic induction during the electrostatic charging is gradually transferred to the pixel electrodes or the circuit part, so that the electrostatic charge builds up in both sites. Thereafter, the electrostatic charge is quickly transferred from the circuit part during discharge. In contrast, the electrostatic charge on the pixel electrodes cannot move toward the circuit part and therefore is more likely to remain, because the pixel electrodes are electrically isolated from the circuit part by the switching elements (thin film transistors) in the non-driving state. It is considered that due to these factors, the backside substrate in this embodiment is less susceptible to electrostatic decay, after it is electrostatically charged. It is considered that in the continuous manufacturing system and method of this embodiment, a polarizing plate is bonded to the backside substrate (first substrate) earlier than to the display surface side substrate (second substrate), so that friction between the first substrate and the bonding roller is prevented and that the first substrate itself is inhibited from being electrostatically charged, which makes it possible to quickly attenuate the electrostatic charge on the liquid crystal cell.

Other Manufacturing Methods

In this embodiment, the first polarizing plate is bonded to the liquid crystal cell from the lower side, and the second polarizing plate is bonded to the liquid crystal cell from the upper side. However, the direction of the bonding of the first and second polarizing plates is not limited to this mode. For example, after the first polarizing plate is bonded to the liquid crystal cell from the lower side, the liquid crystal cell may be turned upside down, and the second polarizing plate may also be bonded to the liquid crystal cell from the lower side.

Alternatively, the timing of the cutting of the belt-shaped polarizing plat may be after the bonding of the belt-shaped polarizing plate to the liquid crystal cell. In this case, the first belt-shaped film is drawn from the first polarizing plate roll, and the first belt-shaped polarizing plate is bonded to the first substrate of the liquid crystal cell using bonding means, after (or while) the first belt-shaped polarizing plate is peeled off from the first belt-shaped carrier film. Subsequently, the first belt-shaped polarizing plate is cut into a piece depending on the size of the liquid crystal cell using cutting means, so that a piece of the first polarizing plate is formed on the first substrate of the liquid crystal cell. The second belt-shaped film is drawn from the second polarizing plate roll, and the second belt-shaped polarizing plate is bonded to the second substrate of the liquid crystal cell using bonding means, after (or while) the second belt-shaped polarizing plate is peeled off from the second belt-shaped carrier film. Subsequently, the second belt-shaped polarizing plate is cut into a piece depending on the size of the liquid crystal cell using cutting means, so that a piece of the second polarizing plate is formed on the second substrate of the liquid crystal cell. Subsequently, the liquid crystal display panel is optically inspected (preferably in a line mode) with no voltage applied to the liquid crystal display panel.

Other Polarizing Plate Rolls

In this embodiment, the first and second belt-shaped polarizing plates each have an absorption axis in the longitudinal direction. However, the direction of the absorption axis of each of the first and second belt-shaped polarizing plates is not limited thereto. Alternatively, for example, the first belt-shaped polarizing plate may have an absorption axis in the transverse (width) direction, and the second belt-shaped polarizing plate may have an absorption axis in the longitudinal direction. In this case, the turning mechanism for horizontally turning by 90° the liquid crystal cell with the first polarizing plate bonded thereto may be omitted as appropriate.

The first and second belt-shaped polarizing plates in the first and second polarizing plate rolls may also have previously undergone cutting. Specifically, the first and second polarizing plate rolls to be used may be so-called scored polarizing plate rolls. In this case, the first cutting means (first cutting step) and the second cutting means (second cutting step) are unnecessary, so that the tact time can be reduced.

Embodiment 2

A description is given of a case where an in-plane switching (IPS)-type liquid crystal cell is used.

Figure 3:
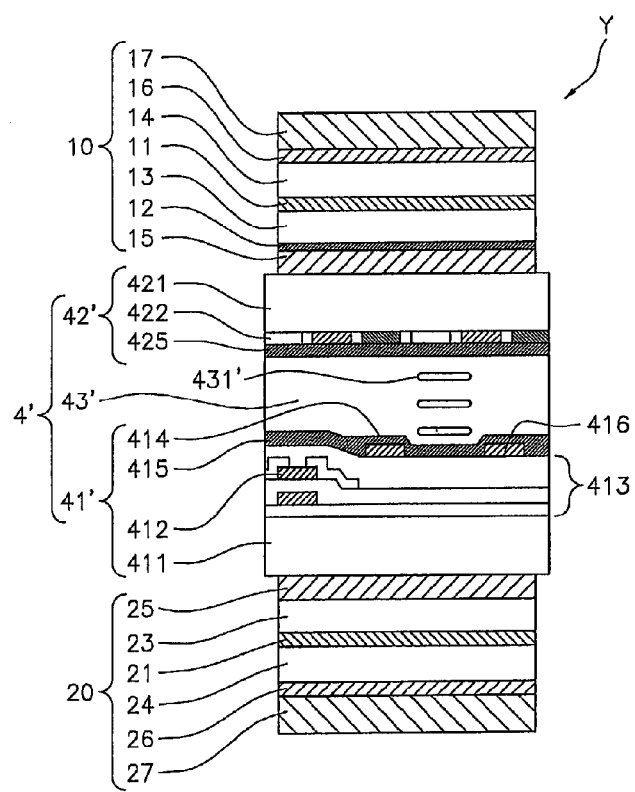
FIG. 3 is a schematic cross-sectional view of a liquid crystal display panel in embodiment 2.
Figure 4:
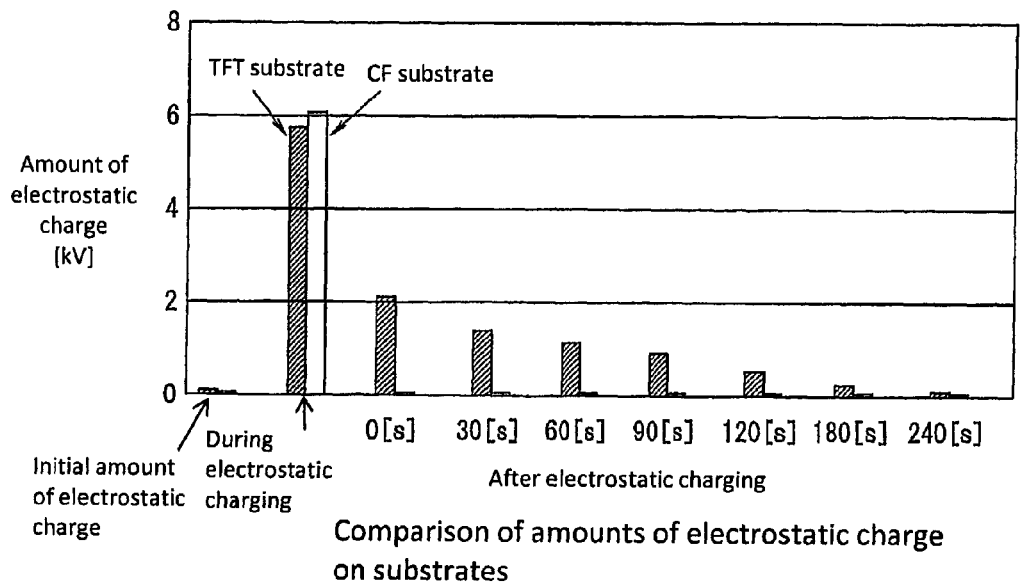
FIG. 4 is a graph showing the result of the measurement of vertical alignment (VA)-type CF and TFT substrates for a tendency to be electrostatically charged.

FIG. 3 is a schematic cross-sectional view of a liquid crystal display panel Y with an IPS-type liquid crystal cell. In FIG. 4, the same elements are represented by the same reference characters as in FIG. 1, and a repeated description thereof will be omitted as appropriate. As shown in FIG. 4, an IPS-type liquid crystal cell 4' is configured to have a liquid crystal layer 43' placed between a pair of substrates 41' and 42' similarly to other liquid crystal cells. The display surface side substrate 42' located on the display surface side of the liquid crystal cell 4' does not have any electrically-conductive components such as pixel electrodes and a common electrode. In contrast, the backside substrate 41' located on the back side of the liquid crystal cell 4' is configured to have a common electrode and pixel electrodes for driving the liquid crystal layer 43', so that the liquid crystal layer 43' is driven by an electric field applied between the common electrode and the pixel electrodes, specifically, in a direction substantially parallel to the surface of the substrate.

Specifically, the backside substrate 41' includes a transparent substrate 411 of glass, plastic or the like; a circuit part that is provided on the transparent substrate 411 and includes a plurality of gate wirings and a plurality of common electrode wirings, and a plurality of source wirings arranged perpendicular to the gate wirings and the common electrode wirings and provided thereon with a gate insulating film interposed therebetween; thin film transistors (TFT) 412 provided as a plurality of switching elements at the intersections of the gate wirings and the source wirings; a protective film 413 provided on the switching elements (thin film transistors) 412; a plurality of transparent electrodes (pixel electrodes) 414 provided on the protective film 413 and connected to the switching elements 412, respectively, via contact holes formed through the protective film 413; a plurality of common electrodes 416 provided on the protective film 413 and connected to the common electrode wirings, respectively, via contact holes formed through the gate insulating film and the protective; and an alignment film 415 provided on the transparent electrodes (pixel electrodes) 414 and the common electrodes 416.

The thin film transistors 412 each include a gate electrode, a semiconductor layer opposed to the gate electrode with a gate insulating film interposed therebetween, and source and drain electrodes independently connected to the semiconductor layer. The gate wiring is connected to the gate electrode, the source wiring is connected to the source electrode, and the pixel electrode 414 is connected to the drain electrode.

On the other hand, the display surface side substrate 42' includes a transparent substrate 421 of glass, plastic, or the like; a color filter 422 provided on the transparent substrate 421; an overcoat layer (not shown) provided on the color filter 422; and an alignment film 425 provided on the overcoat layer.

The liquid crystal layer 43' of the liquid crystal cell 4' is generally made of a nematic liquid crystal molecule 431' having positive dielectric anisotropy ($\Delta \in > 0$) or negative dielectric anisotropy ($\Delta \in < 0$). The liquid crystal layer 43' is driven by a voltage applied in a direction substantially parallel to the substrate surface between the pixel electrode 414 and the common electrode 416. Therefore, when the voltage is less than the threshold voltage, the long axis of the liquid crystal molecule 431' is parallel to the substrate surface and parallel or perpendicular to the absorption axis of the first polarizer 11 of the first polarizing plate 10, so that linearly polarized light incident on the back side does not undergo a birefringence effect when passing through the liquid crystal layer 43'. When the voltage becomes the threshold voltage or more, the long axes of most of the liquid crystal molecules 431, exclusive of those in the vicinity of substrate surface, are rotated in an in-plane direction parallel to the substrate surface at a certain angle depending on the magnitude of the voltage (and tilted with respect to the absorption axis of the first polarizer 11 of the first polarizing plate 10), so that linearly polarized incident light undergoes a birefringence effect and is changed into elliptically polarized light. As a result, a certain amount of light, which depends on the rotation angle of the liquid crystal molecules, passes through the first polarizer 11 of the first polarizing plate 10.

In such an IPS-type liquid crystal cell used, the display surface side substrate 42' has a structure that is less susceptible to electrostatic decay than the backside substrate 41', after it is electrostatically charged, because it does not have electrically-conductive components such as pixel and common electrodes. Therefore, when an IPS-type liquid crystal cell is used, the display surface side substrate 42' is a substrate (first substrate) to which a polarizing plate should be bonded first, and the backside substrate 41' is a substrate (second substrate) to which a polarizing plate should be bonded subsequently.

In the system and method according to embodiment 2 for continuously manufacturing a liquid crystal display panel, the display surface side substrate corresponds to the first substrate, the display surface side polarizing plate corresponds to the first polarizing plate, the backside substrates corresponds to the second substrate, and the backside polarizing plate corresponds to the second polarizing plate. Other features are the same as those of the continuous manufacturing method and system in Embodiment 1 above, and therefore a description thereof is omitted here.

In the system and method according to embodiment 2 for continuously manufacturing a liquid crystal display panel, the above procedure is performed, specifically, the display surface side substrate 42' is used as the first substrate, to which the first polarizing plate is bonded, and subsequently, the backside substrate 41' is used as the second substrate, to which the second polarizing plate is bonded. This makes it possible to quickly attenuate the electrostatic charge on the liquid crystal cell 4' when the first and second polarizing plates are bonded, so that the inspection of the liquid crystal display panel can be quickly performed without the adverse effect of the electrostatic charge on the liquid crystal cell after the bonding of the polarizing plates. As a result, high-quality IPS-type liquid crystal display panels can be continuously manufactured at high speed, which makes it possible to substantially increase the production efficiency.

Although the mechanism of how this embodiment is effective is not clear, it is considered that in embodiment 2 where an IPS-type liquid crystal cell is used, the display surface side substrate is less susceptible to electrostatic decay, once it is electrostatically charged, so that the electrostatic charge produced by the friction with a bonding roller remains on the liquid crystal cell, because the display surface side substrate does not have electrically-conductive components such as pixel and common electrodes. It is considered that in the continuous manufacturing system and method according to embodiment 2, a polarizing plate is bonded to the display surface side substrate (first substrate) earlier than to the backside substrate (second substrate), so that friction between the bonding roller and the display surface side substrate having the above structure is prevented and that the first substrate itself is inhibited from being electrostatically charged, which makes it possible to quickly attenuate the electrostatic charge on the liquid crystal cell.

The IPS type may also have the problem of electrostatic destruction of switching elements (thin film transistors). It is considered that the mechanism of destruction of switching elements in a liquid crystal cell involves allowing excessive current to flow through switching elements when the electrostatic charge accumulated on the display surface side substrate (first substrate) is discharged toward the backside substrate (second substrate), so that the switching elements are destroyed. It is considered that in the continuous manufacturing system and method according to this embodiment, such electrostatic destruction of switching elements is also suppressed.

In an embodiment of the invention, as long as the effects of the invention are attained, any appropriate means (step) may be interposed between the respective steps (for example, between the second polarizing plate bonding means (the second polarizing plate bonding step) and the inspection means (the inspection step)). Any other means (step) may also be provided before the first polarizing plate bonding means (the first polarizing plate bonding step), before the second polarizing plate bonding means (the second polarizing plate bonding step), or after the inspection means (the inspection step).

EXAMPLES

Measurement of Electrostatic Decay of Liquid Crystal Cell Substrate

Electrostatic decay after electrification was measured for each of a CF substrate (color filter-containing substrate) and a TFT substrate (thin film transistors-containing substrate), each of which was a component of a VA-type liquid crystal cell, and another CF substrate and another TFT substrate, each of which was a component of an IPS-type liquid crystal cell. The TFT substrate and the CF substrate were each separated by cutting from the joint in the liquid crystal cell, and the liquid crystal deposited on the inner side of each substrate was wiped off with alcohol. For the measurement, both ends of the substrate was mounted and fixed on a PTFE (polytetrafluoroethylene) support. Thereafter, a laminated disc (0.8 mm thick, 250 mm φ), which was formed by stacking a PTFE disc and a SUS 304 disc, was electrostatically charged by rubbing the SUS 304 disc side several times with a cloth, and the SUS 304 disc was attached to the fixed substrate and then separated from the substrate. While a series of these procedures was performed, the amount of electrostatic charge on the substrate was measured using an electrostatic charge meter (IZH10 manufacture by SMC Corporation) from the back side opposite to the attached surface of the substrate. The results are shown in Table 1 below, FIG. 4 (the result on the VA-type), and FIG. 5 (the result on the IPS-type).

TABLE 1

| Liquid crystal cell | | Initial amount of electrostatic charge | During electrostatic charging | After electrostatic charging (s) | | | | | | |
|---|---|---|---|---|---|---|---|---|---|---|
| | | | | 0 | 30 | 60 | 90 | 120 | 180 | 240 |
| VA type | TFT substrate (First substrate) | 0.1 | 5.8 | 2.1 | 1.4 | 1.1 | 0.9 | 0.5 | 0.2 | 0.1 |
| | CF substrate (Second substrate) | 0.05 | 6.1 | 0.05 | 0.05 | 0.05 | 0.05 | 0.00 | 0.05 | 0.05 |
| IPS type | TFT substrate (Second substrate) | 0.08 | 6.8 | 0.6 | 0.09 | 0.08 | 0.06 | 0.05 | 0.05 | 0.02 |
| | CF substrate (First substrate) | 0.1 | 6.5 | 5.9 | 5.1 | 4.3 | 3.5 | 2.2 | 1.8 | 0.8 |

Table 1 and FIG. 4 show that even after the PTFE disc was separated, the TFT substrate for the VA-type liquid crystal cell remained electrostatically charged for a while. In contrast, it was found that immediately after the PTFE disc was separated, the CF substrate for the VA-type liquid crystal cell returned to the initial state. In the VA-type liquid crystal cell used in this test, therefore, the TFT substrate has such properties that it is less susceptible to electrostatic decay after electrostatically charged, and therefore corresponds to the first substrate, and the CF substrate has such properties that it is susceptible to electrostatic decay after electrostatically charged, and therefore corresponds to the second substrate.

Figure 5:
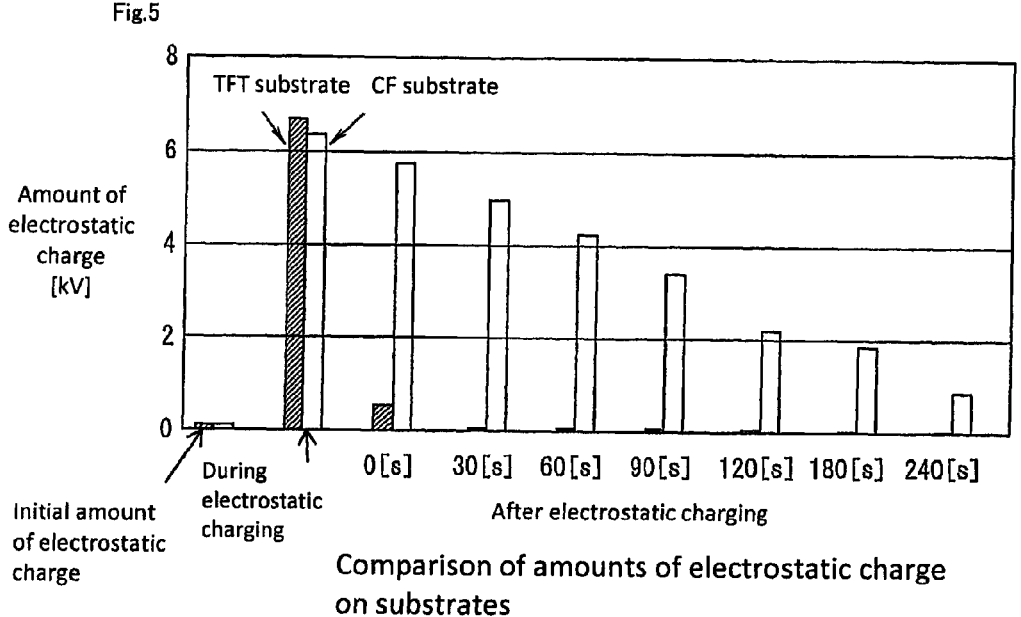
FIG. 5 is a graph showing the result of the measurement of in-plane switching (IPS)-type CF and TFT substrates for a tendency to be electrostatically charged.

Table 1 and FIG. 5 show that the TFT substrate and the CF substrate for the IPS-type liquid crystal cell have a reverse tendency to the substrates for the VA-type liquid crystal cell. Namely, in the IPS-type liquid crystal cell used in the test, the CF substrate has such properties that it is less susceptible to electrostatic decay after electrostatically charged, and therefore corresponds to the first substrate, and the TFT substrate has such properties that it is susceptible to electrostatic decay after electrostatically charged, and therefore corresponds to the second substrate.

The examples and the comparative examples below were performed using the VA-type liquid crystal cell, in which a test was performed using the TFT substrate as the first substrate and using the CF substrate as the second substrate.

Example 1

Figure 2:
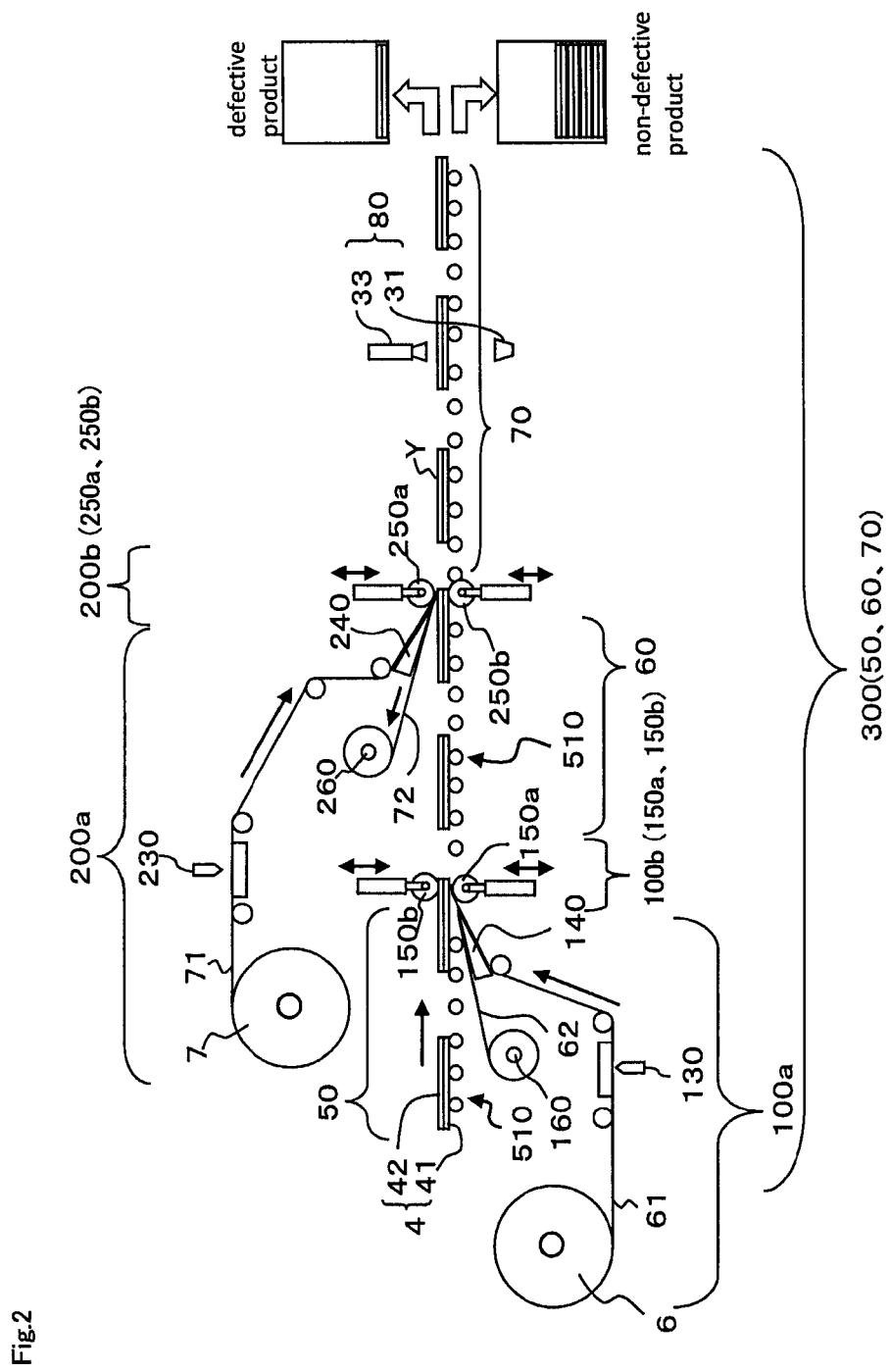
FIG. 2 is a schematic diagram showing an example of the system according to embodiment 1 for continuously manufacturing a liquid crystal display panel.

The continuous manufacturing system shown in FIG. 2 was used. A first polarizing plate with a width corresponding to the long side of the VA-type liquid crystal cell was bonded to the liquid crystal cell (the first polarizing plate bonding step), and then the liquid crystal cell was horizontally turned by 90° and aligned. Subsequently, a second polarizing plate with a width corresponding to the short side of the liquid crystal cell was bonded to the liquid crystal cell (the second polarizing plate bonding step). In this manner, 2,000 liquid crystal display panels were continuously manufactured. The speed at which each polarizing plate was bonded and the speed at which the liquid crystal cell and the liquid crystal display panel were fed were 200 mm/second. The materials and apparatuses used were as described below. The surface resistance of the electrically-conductive layer contained as a part in the polarizing plate was measured according to JIS K 6911, 5.13. Specifically, the polarizing plate raw material was cut into a test piece with a size of 150 mm×150 mm, and the surface resistance of the test piece was measured using Hiresta UP (a high resistance/low efficiency meter, model: MCP-HT450) manufactured by Mitsubishi Chemical Analytech Co., Ltd. and a probe (model: MCP-SWB01). The bonding speed was the measured value of the speed at which the polarizing plate and the liquid crystal cell passed between the bonding roller and the supporting roller described below. Therefore, the polarizing plate-bonding speed was equal to the liquid crystal cell-feed speed.

Materials and Apparatuses Used

The liquid crystal cell was of a vertical alignment type (with a screen size of 32 inches). The first polarizing plate roll and the second polarizing plate roll were each VEG1724DU-AC (trade name) manufactured by NITTO DENKO CORPORATION (containing an electrically-conductive layer with a surface resistance of $1.0 \times 10^{11}$ Ω/square and a thickness of 150 μm), and the structure and composition of the first and second polarizing plates were as shown in FIG. 1. The bonding roller (on the bonding side) was Model LM4070E manufactured by Katsura Roller Mfg. Co., Ltd., which was an electrically-conductive silicone roller with a hardness of 70°, a surface resistance of $1.0 \times 10^6$ Ω/square, and a roller diameter of 100 mm. The supporting roller (on the support side) was Model BLACK EC-N970 manufactured by Katsura Roller Mfg. Co., Ltd., which was an electrically-conductive urethane roller with a hardness of 70°, a surface resistance of $1.0 \times 10^8$ Ω/square, and a roller diameter of 200 mm.

Examples 2 to 4

Two thousand liquid crystal display panels were manufactured as in example 1, except that the polarizing plate-bonding speed and the liquid crystal cell and liquid crystal display panel-feed speed were 150 mm/second (Example 2), 100 mm/second (Example 3), or 50 mm/second (example 4).

Comparative Example 1

Two thousand liquid crystal display panels were manufactured as in example 1, except that the bonding order was reverse to that in example 1, namely, the first polarizing plate bonding step was performed after the second polarizing plate bonding step.

Comparative Examples 2 to 4

Two thousand liquid crystal display panels were manufactured as in comparative example 1, except that the polarizing plate-bonding speed and the liquid crystal cell and liquid crystal display panel-feed speed were 150 mm/second (comparative example 2), 100 mm/second (comparative example 3), or 50 mm/second (comparative example 4).

Comparative Example 5

Two thousand liquid crystal display panels were manufactured as in comparative example 1, except that the first polarizing plate bonding step and the inspection step were separated from each other based on the result of the measurement of the amount of electrostatic charge on the liquid crystal cell (Table 1 and FIG. 4) and that the time interval between the first polarizing plate bonding step and the inspection step was 600 seconds.

Measurement of Amount of Electrostatic Charge

In the examples and the comparative examples, immediately after each bonding step, an electrostatic charge meter (model SK-200 manufactured by KEYENCE CORPORATION) was placed to measure the amount of electrostatic charge after the bonding, and the average value was calculated for the 2,000 liquid crystal display panels. The results are shown in Table 3 below.

Evaluation in Inspection Step

The liquid crystal display panels manufactured in each of the examples and the comparative examples were subjected to the inspection step using an optical inspection apparatus placed downstream of the later bonding step. In the inspection step, light was irradiated to the liquid crystal display panel from its lower surface side with no voltage applied to the liquid crystal display panel, while the liquid crystal display panel was fed. Above the upper side of the liquid crystal display panel, a plurality of CCD cameras (line sensor cameras) were arranged in a line pattern (linearly) along a direction perpendicular to the feed direction of the liquid crystal display panel. Transmission of light, which should otherwise be blocked in the normal state, was detected in a line pattern using the CCD cameras, and image analysis was performed based on the result of the detection.

Table 2 below shows the conditions of each bonding step and the inspection step, and the time required to perform each step.

TABLE 2

| | Feed speed (Bonding speed) (mm/s) | Time required to bond the first piece (s) | Intervals (s) | | | | Time required to bond the second piece (s) | Interval (s) Feeding | Inspection time (s) | Total time (s) |
| --- | --- | --- | --- | --- | --- | --- | --- | --- | --- | --- |
| | | | Feeding | Turning | Feeding | Alignment | | | | |
| Example 1 | 200 | 8 | 5 | 8 | 5 | 8 | 10 | 8 | 8 | 60 |
| Comparative Example 1 | | | | | | | | | | |
| Example 2 | 150 | 11 | 7 | 11 | 7 | 11 | 13 | 11 | 11 | 80 |
| Comparative Example 2 | | | | | | | | | | |
| Example 3 | 100 | 16 | 10 | 16 | 10 | 16 | 20 | 16 | 16 | 120 |
| Comparative Example 3 | | | | | | | | | | |

TABLE 2-continued

| | Feed speed (Bonding speed) (mm/s) | Time required to bond the first piece (s) | Intervals (s) | | | | Time required to bond the second piece (s) | Interval (s) Feeding | Inspection time (s) | Total time (s) |
|---|---|---|---|---|---|---|---|---|---|---|
| | | | Feeding | Turning | Feeding | Alignment | | | | |
| Example 4 Comparative Example 4 | 50 | 32 | 20 | 32 | 20 | 32 | 40 | 32 | 32 | 240 |
| Comparative Example 5 | 200 | 8 | 5 | 8 | 5 | 8 | 10 | 600 | 8 | 652 |

The case where at least one piece was determined to be defective due to the electrostatic charge on the liquid crystal cell (uneven alignment of the liquid crystal molecules) was evaluated as "x", and the case where no piece was determined to be defective was evaluated as "o". The results are shown in Table 3 below.

TABLE 3

| | Feed speed (Bonding speed) (mm/s) | Amount (kV) of electrostatic charge before bonding | Amount (kV) of electrostatic charge after bonding of the first piece | Amount (kV) of electrostatic charge after bonding of the second piece | Evaluation in inspection step | Total time (s) |
|---|---|---|---|---|---|---|
| Example 1 | 200 | 0.02 | 0.12 | 0.08 | o | 60 |
| Example 2 | 150 | 0.04 | 0.09 | 0.11 | o | 80 |
| Example 3 | 100 | 0.05 | 0.08 | 0.21 | o | 120 |
| Example 4 | 50 | 0.01 | 0.11 | 0.17 | o | 240 |
| Comparative Example 1 | 200 | 0.02 | 1.77 | 1.91 | x | 60 |
| Comparative Example 2 | 150 | 0.06 | 0.56 | 1.98 | x | 80 |
| Comparative Example 3 | 100 | 0.03 | 1.92 | 2.07 | x | 120 |
| Comparative Example 4 | 50 | 0.05 | 1.61 | 1.88 | x | 240 |
| Comparative Example 5 | 200 | 0.02 | 1.78 | 1.93 | o | 652 |

As shown in Table 3, a product or products were determined to be defective due to the electrostatic charge on the liquid crystal cell in the inspection step in Comparative Examples 1 to 4 where the CF substrate (second substrate) susceptible to electrostatic decay after electrostatic charging was first subjected to the bonding step. However, no product was determined to be defective in the inspection step in Examples 1 to 4 where the TFT substrate (first substrate) less susceptible to electrostatic decay after electrostatic charging was first subjected to the bonding step. In comparative example 5, it was able to prevent the product rejection, but the productivity was significantly reduced, because the first polarizing plate bonding step and the inspection step were separated from each other and a long time for waiting for the inspection was provided.

What is claimed is:

1. A method for continuously manufacturing an inspected liquid crystal display panel, comprising:
   a continuous transport line for sequentially transporting a liquid crystal cell, the continuous transport line including a first laminating station provided in the continuous transport line for applying a first polarizing plate unrolled from a first roll of the first polarizing plate to a first side of the liquid crystal cell transported to the first laminating station, a second laminating station provided in the continuous transport line downstream of the first laminating station for applying a second polarizing plate unrolled from a second roll of the second polarizing plate to a second side of the liquid crystal cell transported to the second laminating station to form a liquid crystal display panel, and an inspecting station provided in the continuous transport line downstream of the second laminating station for optically inspecting the liquid crystal display panel transported from the second laminating station along the continuous transport line to the inspecting station;
   the method comprising:
   transporting the liquid crystal cell sequentially along continuous transport line, wherein each liquid crystal cell has a first substrate and a second substrate, respectively, which are opposite to one another, and the first substrate has a relatively slower decay of electrostatic charge than the second substrate;
   applying at the first laminating station the first polarizing plate unrolled from a first polarizing plate roll to the first substrate of the liquid crystal cell transported to the first laminating station; then
   applying at the second laminating station the second polarizing plate unrolled from a second polarizing plate roll to the second substrate of the liquid crystal cell transported from the first laminating station along the continuous transport line to the second laminating station, to thereby form the liquid crystal display panel; and then
   optically inspecting at the inspecting station the liquid crystal display panel transported from the second laminating station along the continuous transport line to the inspecting station;
   wherein in the optically inspecting station, the liquid crystal display panel is irradiated with a transmitted light on one side of the liquid crystal panel and then imaging the irradiated liquid crystal display panel without applying electric voltage to the liquid crystal display panel.

2. The method according to claim 1,
wherein the first laminating station comprises bonding the first polarizing plate to the first substrate of the liquid crystal cell while feeding the liquid crystal cell from a feed-in side to a feed-out side along the feed line,
the second laminating station comprises bonding the second polarizing plate to the second substrate of the liquid crystal cell while feeding the liquid crystal cell from a feed-in side to a feed-out side along the feed line, and
the inspecting station comprises inspecting, in a line mode, the liquid crystal display panel formed in the first laminating station and the second laminating station, while feeding the liquid crystal display panel from the feed-in side to the feed-out side along the feed line.

3. The method according to claim 1,
wherein the first laminating station comprises catching, between a pair of first bonding rollers, the liquid crystal cell and the first polarizing plat; to bond the first polarizing plate to the first substrate of the liquid crystal cell, and
the second laminating station comprises catching, between a pair of second rollers, the liquid crystal cell with the first polarizing plate bonded thereto and the second polarizing plat; to bond the second polarizing plate to the second substrate of the liquid crystal cell.

4. The method according to claim 1, wherein the first polarizing plate has an electrically-conductive layer.

5. The method according to claim 1, wherein the second polarizing plate has an electrically-conductive layer.

6. The method according to claim 4, wherein the electrically-conductive layer has a surface resistance of $1.0 \times 10^{12}$ Ω/square or less.

7. The method according to claim 5, wherein the electrically-conductive layer has a surface resistance of $1.0 \times 10^{12}$ Ω/square or less.

8. The method according to claim 1, wherein the liquid crystal cell is transported through the inspecting station at a speed that is at least equal or greater than the speed the liquid crystal cell is transported through the first laminating station and the second laminating station.

9. The method according to claim 1, wherein the continuous transport line is a single continuous transport line.

* * * * *